(12) United States Patent
Idei et al.

(10) Patent No.: US 9,879,108 B2
(45) Date of Patent: Jan. 30, 2018

(54) COMPOSITION, CURED FILM, COLOR FILTER, LAMINATE, AND PIGMENT DISPERSANT

(71) Applicant: FUJIFILM CORPORATION, Tokyo (JP)

(72) Inventors: Hiroaki Idei, Haibara-gun (JP); Toshihito Kuge, Haibara-gun (JP); Takashi Kawashima, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

(21) Appl. No.: 14/950,911

(22) Filed: Nov. 24, 2015

(65) Prior Publication Data

US 2016/0075807 A1  Mar. 17, 2016

Related U.S. Application Data

(63) Continuation of application No. PCT/JP2014/063803, filed on May 26, 2014.

(30) Foreign Application Priority Data

Jun. 20, 2013 (JP) .................................. 2013-129518
May 19, 2014 (JP) .................................. 2014-103280

(51) Int. Cl.
| | | |
|---|---|---|
| *B32B 27/06* | (2006.01) | |
| *B32B 27/20* | (2006.01) | |
| *C08L 33/14* | (2006.01) | |
| *C08F 220/68* | (2006.01) | |
| *G02B 5/22* | (2006.01) | |
| *C09B 67/46* | (2006.01) | |
| *C08K 5/00* | (2006.01) | |

(52) U.S. Cl.
CPC ............ *C08F 220/68* (2013.01); *B32B 27/06* (2013.01); *B32B 27/20* (2013.01); *C08K 5/0041* (2013.01); *C08L 33/14* (2013.01); *C09B 67/009* (2013.01); *G02B 5/223* (2013.01); *B32B 2307/4026* (2013.01); *B32B 2307/7244* (2013.01)

(58) Field of Classification Search
None
See application file for complete search history.

(56) References Cited

U.S. PATENT DOCUMENTS

| 8,389,125 B2 | 3/2013 | Kaneko et al. |
| 2011/0045412 A1* | 2/2011 | Kaneko ................. C08F 290/00 430/321 |
| 2013/0028587 A1 | 1/2013 | Kaneko et al. |

FOREIGN PATENT DOCUMENTS

| JP | 2003-12744 A | 1/2003 |
| JP | 2010-54808 A | 3/2010 |
| JP | 2011-137125 A | 7/2011 |
| JP | 2011-203506 A | 10/2011 |
| JP | 2011-248197 A | 12/2011 |
| JP | 5141448 B2 | 2/2013 |
| TW | 201041982 A | 12/2010 |
| TW | 201213350 A | 4/2012 |

OTHER PUBLICATIONS

Communication dated Sep. 30, 2016, from the State Intellectual Property Office of People's Republic of China in counterpart Application No. 201480029043.0.
Communication dated Apr. 12, 2017, issued from the State Intellectual Property Office of People's Republic of China in counterpart Application No. 201480029043.0.
International Search Report of PCT/JP2014/063803, dated Aug. 12, 2014. [PCT/ISA/210].
Written Opinion of PCT/JP2014/063803, dated Aug. 12, 2014. [PCT/ISA/237].
Communication dated Feb. 20, 2017 from the Korean Intellectual Property Office in counterpart Korean application No. 10-2015-7032689.
International Preliminary Report on Patentability and Written Opinion, dated Dec. 22, 2015, issued in corresponding International Application No. PCT/JP2014/063803, 12 pages in English and Japanese.
Communication dated Apr. 22, 2016, from the State Intellectual Property Office of People's Republic of China in counterpart Application No. 201480029043.0.
Communication dated Dec. 20, 2016, from the Japanese Patent Office in counterpart application No. 2014-103280.
Communication dated May 9, 2017, from the Taiwanese Patent Office in counterpart Taiwanese application No. 103121211.

* cited by examiner

*Primary Examiner* — Sheeba Ahmed
(74) *Attorney, Agent, or Firm* — Sughrue Mion, PLLC

(57) ABSTRACT

The composition includes (A) a pigment; and (B) a polymer having (b-1) a bulky amine moiety, (b-2) an acid group, and (b-3) a constituent unit derived from a macromonomer having a weight average molecular weight of 1000 to 50000, in which the bulky amine moiety (b-1) has a nitrogen atom, carbon atoms $X^1$ bonded with the nitrogen atom, and carbon atoms $Y^1$ bonded with the carbon atoms $X^1$, and a total carbon number of the carbon atoms $X^1$ and the carbon atoms $Y^1$ is 7 or more.

20 Claims, No Drawings

COMPOSITION, CURED FILM, COLOR FILTER, LAMINATE, AND PIGMENT DISPERSANT

CROSS-REFERENCE TO RELATED APPLICATIONS

This application is a Continuation of PCT International Application No. PCT/JP2014/63803, filed on May 26, 2014, which claims priority under 35 U.S.C. § 119(a) to Japanese Patent Application No. 2013-129518, filed on Jun. 20, 2013, and Japanese Patent Application No. 2014-103280, filed on May 19, 2014. Each of the above application(s) is hereby expressly incorporated by reference, in its entirety, into the present application.

BACKGROUND OF THE INVENTION

1. Field of the Invention

The present invention relates to a composition, a cured film, a color filter, a laminate, and a pigment dispersant.

2. Description of the Related Art

Pigments or dyes are used as coloring agents for colored photosensitive compositions for manufacturing color filters. In a case of using coloring agents (primarily, pigments) of which the degree of solubility in a solvent or the like is low, a dispersant is used in order to appropriately disperse the pigment in a binder resin or the like (for example, JP2011-137125A, JP2003-012744A, and JP2010-54808A (JP5141448B)).

SUMMARY OF THE INVENTION

As a result of research by the present inventors, it was understood that, depending on the type of dispersant, there are cases where the long-term light resistance is poor when a composition which includes the dispersant and pigments is left in an environment having a low oxygen concentration.

The present invention is to solve this problem and has an object of providing a dispersant and a composition, with which it is possible to maintain a favorable long-term light resistance while maintaining the dispersibility and dispersion stability of a pigment even when left in an environment having a low oxygen concentration, a cured film, a color filter, a laminate, and a pigment dispersant.

As a result of the present inventors performing research under these conditions, it was discovered that it is possible to solve the problem described above.

In detail, the problem described above was solved by Solving Means <1> below, preferably by means <2> to <17>.

<1> A composition including
(A) a pigment; and
(B) a polymer having (b-1) a bulky amine moiety, (b-2) an acid group, and (b-3) a constituent unit derived from a macromonomer having a weight average molecular weight of 1000 to 50000,
in which the bulky amine moiety (b-1) has a nitrogen atom, carbon atoms $X^1$ bonded with the nitrogen atom, and carbon atoms $Y^1$ bonded with the carbon atoms $X^1$, and a total carbon number of the carbon atoms $X^1$ and the carbon atoms $Y^1$ is 7 or more.

<2> The composition according to <1>, in which the bulky amine moiety (b-1) is represented by General Formula (b-1A) below;

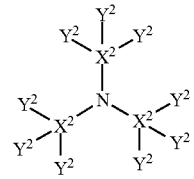

General Formula (b-1A)

in General Formula (b-1A), $X^2$ are each a hydrogen atom, an oxygen atom, or a carbon atom and
$Y^2$ are each an arbitrary atom; there is no atom which corresponds to $Y^2$ when $X^2$ is a hydrogen atom; there is no atom which corresponds to $Y^2$ when $X^2$ is an oxygen atom with a free radical structure; and a total carbon number of carbon atoms of $X^2$ and $Y^2$ is 7 or more.

<3> The composition according to <1>, in which the total carbon number of the carbon atoms $X^1$ and the carbon atoms $Y^1$ is 8 or more.

<4> The composition according to <2>, in which the total carbon number of carbon atoms of $X^2$ and $Y^2$ in General Formula (b-1A) is 8 or more.

<5> The composition according to any one of <1> to <4>, in which the polymer (B) is represented by General Formula (B-1) below;

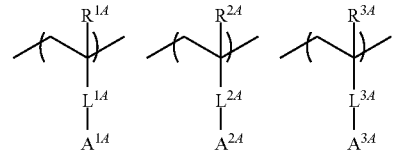

General Formulas (B-1)

in General Formula (B-1), $R^{1A}$ to $R^{3A}$ each independently represent a hydrogen atom or a methyl group; $L^{1A}$ to $L^{3A}$ each independently represent a single bond or a divalent linking group; $A^{1A}$ represents the bulky amine moiety (b-1); $A^{2A}$ represents the acid group (b-2); and $A^{3A}$ represents the moiety (b-3) having a weight average molecular weight of 1000 to 50000.

<6> The composition according to any one of <1> to <5>, in which an acid value of the polymer (B) is 15 mgKOH/g to 250 mgKOH/g.

<7> The composition according to any one of <1> to <6>, in which an amine value of the polymer (B) is 0.2 mmol/g to 2.5 mmol/g.

<8> The composition according to any one of <1> to <7>, further including a pigment derivative.

<9> The composition according to any one of <1> to <8>, in which the acid group (b-2) is at least one selected from a carboxyl group, a sulfonic acid group, a phosphoric acid group, an acetoacetyl group, and a phenol group.

<10> The composition according to any one of <1> to <9>, in which the constituent unit (b-3) derived from a macromonomer having a weight average molecular weight of 1000 to 50000 has a constituent unit which is represented by General Formula (b-3B) below;

General Formula (b-3B)

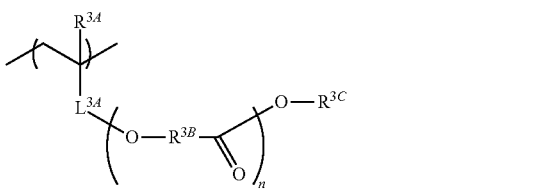

in General Formula (b-3B), $R^{3A}$ represents a hydrogen atom or a methyl group; $L^{3A}$ represents a single bond or a divalent linking group; $R^{3B}$ represents an alkylene group; $R^{3C}$ represents an alkyl group; and n represents an integer of 5 to 100.

<11> The composition according to any one of <1> to <10>, in which a content of the constituent unit which has the bulky amine moiety (b-1) is 20 mol % to 70 mol % of all of the constituent units in the polymer (B).

<12> The composition according to any one of <1> to <11>, further including a solvent.

<13> The composition according to <12>, in which the composition is a dispersion in which a pigment, of which a degree of solubility with respect to the solvent at 25° C. is 0.001 g/100 g solvent or less, is dispersed.

<14> The composition according to any one of <1> to <13>, further including a photopolymerization initiator; and a photopolymerizable compound.

<15> A cured film formed by curing the composition according to <14>.

<16> A color filter including a colored layer formed from the composition according to <14>.

<17> A laminate including the cured film according to <15>; and an oxygen-impermeable film of which an oxygen transmission rate is 50 ml/m²·day·atm or less.

<18> A pigment dispersant including (B) a polymer having (b-1) a bulky amine moiety, (b-2) an acid group, and (b-3) a constituent unit derived from a macromonomer having a weight average molecular weight of 1000 to 50000, in which the bulky amine moiety (b-1) has a nitrogen atom, carbon atoms $X^1$ bonded with the nitrogen atom, and carbon atoms $Y^1$ bonded with the carbon atoms $X^1$, and a total carbon number of the carbon atoms $X^1$ and the carbon atoms $Y^1$ is 7 or more.

According to the present invention, it is possible to provide a composition, with which it is possible to maintain a favorable long-term light resistance while maintaining the dispersibility and dispersion stability of a pigment even when left in an environment having a low oxygen concentration, a cured film, a color filter, a laminate, and a pigment dispersant.

DESCRIPTION OF THE PREFERRED EMBODIMENTS

Detailed description will be given below of the contents of the present invention. The description of the constituent requirements is given below based on representative embodiments of the present invention; however, the present invention is not limited to these embodiments.

In the present specification, "to" is used with the meaning that the numeric values described before and after are included as the lower limit value and the upper limit value.

In the notation of the groups (atomic groups) in the present specification, notation which does not indicate whether a group is substituted or unsubstituted encompasses having a substituent group as well as not having a substituent group. For example, an "alkyl group" encompasses not only an alkyl group which does not have a substituent group (an unsubstituted alkyl group), but also an alkyl group which has a substituent group (a substituted alkyl group).

In the present specification, "(meth)acrylate" represents acrylate and methacrylate, "(meth)acryl" represents acryl and methacryl, and "(meth)acryloyl" represents acryloyl and methacryloyl.

<Composition>

The composition of the present invention includes (A) a pigment and (B) a polymer having (b-1) a bulky amine moiety, (b-2) an acid group, and (b-3) a constituent unit derived from a macromonomer having a weight average molecular weight of 1000 to 50000, in which the bulky amine moiety (b-1) has a nitrogen atom, carbon atoms $X^1$ bonded with the nitrogen atom, and carbon atoms $Y^1$ bonded with the carbon atoms $X^1$, and a total carbon number of the carbon atoms $X^1$ and the carbon atoms $Y^1$ is 7 or more.

By blending a polymer which has the bulky amine moiety (b-1) in the composition, it is possible to provide a dispersant, with a favorable long-term light resistance in an environment having a low oxygen concentration while maintaining the dispersibility and dispersion stability of a pigment, and a composition which includes the dispersant. Furthermore, according to the present invention, it is possible to provide a composition with favorable transparency when formed into a film.

The composition of the present invention is able to be a dispersion (a dispersing liquid) in which a pigment (A) is dispersed in a solvent. In addition, the colored composition of the present invention is able to be a colored composition for a color filter or the like which further includes cured components (for example, a binder, a photopolymerizable compound, and the like) in addition to the pigment (A) and the polymer (B). In a case of being set as a colored composition for a color filter or the like, various types of additive agents, which are generally blended into colored compositions for color filters such as surfactants, may be preferably blended therein in addition to the pigment (A), the polymer (B), and the cured components. In addition, the composition of the present invention is able to be a cured film formed by curing a colored composition for a color filter.

<<(A) Pigment>>

With regard to the pigment (A) which is used for the present invention, the degree of solubility at 25° C. with respect to at least one type of the solvents described in the "Solvents" section which will be described below is preferably 0.001 g/100 g solvent or less, more preferably 0.0001 g/100 g solvent or less, and even more preferably 0.00001 g/100 g solvent or less.

As a pigment, it is possible to use various types of inorganic pigments and/or organic pigments known in the art. When it is considered that high transmittance is preferable, the inorganic pigments and/or organic pigments are preferably as fine as possible. When the handling property is also considered, the average primary particle diameter of a pigment is preferably 0.01 µm to 0.1 µm and more preferably 0.01 µm to 0.05 µm.

Examples of the inorganic pigments include a metallic compound which is represented by a metal oxide, a metallic complex salt, or the like. Specific examples of the inorganic pigments include metallic oxides such as iron, cobalt, aluminum, cadmium, lead, copper, titanium, magnesium, chromium, zinc, antimony, and silver and composite oxides of the metals described above. It is also possible to use titanium nitride, a silver tin compound, a silver compound, and the like.

Examples of the organic pigments include the following. However, the present invention is not limited thereto.

C.I. Pigment Yellow 1, 2, 3, 4, 5, 6, 10, 11, 12, 13, 14, 15, 16, 17, 18, 20, 24, 31, 32, 34, 35, 35: 1, 36, 36: 1, 37, 37: 1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214, and the like, C.I. Pigment Orange 2, 5, 13, 16, 17: 1, 31, 34, 36, 38, 43, 46, 48, 49, 51, 52, 55, 59, 60, 61, 62, 64, 71, 73, and the like, C.I. Pigment Red 1, 2, 3, 4, 5, 6, 7, 9, 10, 14, 17, 22, 23, 31, 38, 41, 48: 1, 48: 2, 48: 3, 48: 4, 49, 49: 1, 49: 2, 52: 1, 52: 2, 53: 1, 57: 1, 60: 1, 63: 1, 66, 67, 81: 1, 81: 2, 81: 3, 83, 88, 90, 105, 112, 119, 122, 123, 144, 146, 149, 150, 155, 166, 168, 169, 170, 171, 172, 175, 176, 177, 178, 179, 184, 185, 187, 188, 190, 200, 202, 206, 207, 208, 209, 210, 216, 220, 224, 226, 242, 246, 254, 255, 264, 270, 272, and 279

C.I. Pigment Green 7, 10, 36, 37, and 58

C.I. Pigment Violet 1, 19, 23, 27, 32, 37, and 42

C.I. Pigment Blue 1, 2, 15, 15: 1, 15: 2, 15: 3, 15: 4, 15: 6, 16, 22, 60, 64, 66, 79, and 80

C.I. Pigment Black 1

It is possible to use these organic pigments individually or in a combination of various types in order to increase the color purity.

In addition, it is also possible to use an azo pigment as the pigment (A). The azo pigment is preferably an azo pigment which is represented by General Formula (A1) below. For the details, it is possible to refer to the description in paragraphs "0029" to "0136" in JP2011-162760A, the contents of which are included in the present specification.

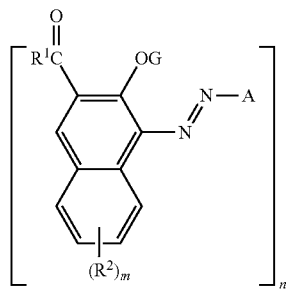
(A1)

(In General Formula (A1), G represents a hydrogen atom, an aliphatic group, an aryl group, or a hetero ring group, R' represents an amino group, an aliphatic oxy group, an aliphatic group, an aryl group, or a hetero ring group, and $R^2$ represents a substituent group.

A represents a hetero ring which has at least one or more atoms selected from a nitrogen atom, an oxygen atom, and a sulfur atom.

m represents an integer of 0 to 5 and n represents an integer of 1 to 4.

In a case where n=2, n represents a dimer via R', $R^2$, A or G.

In a case where n=3, n represents a trimer via R', $R^2$, A or G.

In a case where n=4, n represents a tetramer via R', $R^2$, A or G.

General Formula (A1) does not have an ionic hydrophilic group.)

In General Formula (A1), A preferably represents any one of General Formulas (A-1) to (A-32) below. In General Formulas (A-1) to (A-32), $R^{51}$ to $R^{59}$ each independently represent a hydrogen atom or a substituent group and adjacent substituent groups may bond with to each other to form a 5 to 6 membered ring. * represents a binding position with an azo group in General Formula (A1).

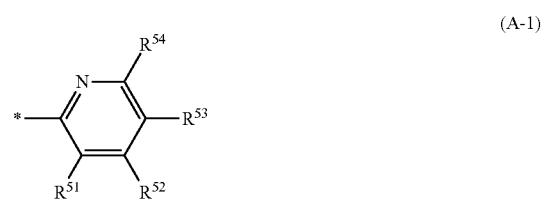
(A-1)

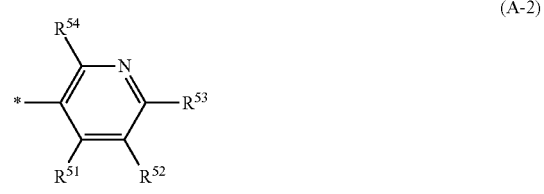
(A-2)

(A-3)

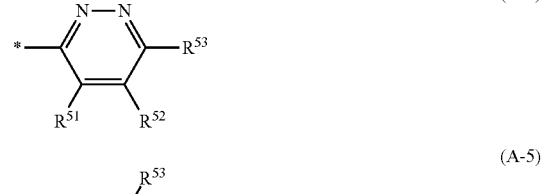
(A-4)

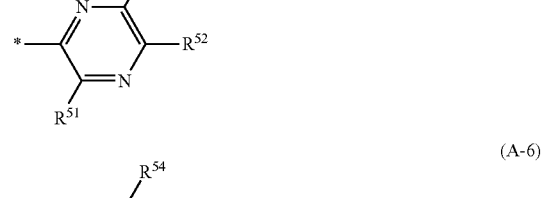
(A-5)

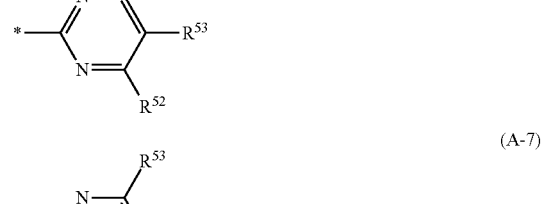
(A-6)

(A-7)

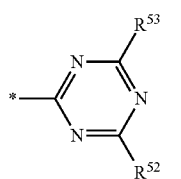 (A-8)
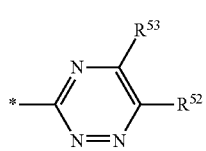 (A-9)
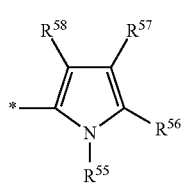 (A-10)
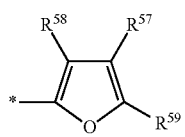 (A-11)
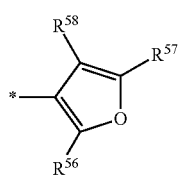 (A-12)
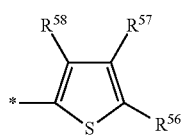 (A-13)
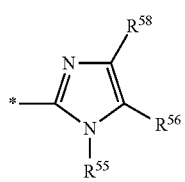 (A-14)
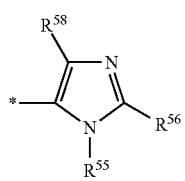 (A-15)
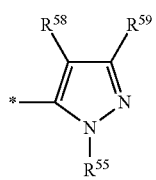 (A-16)
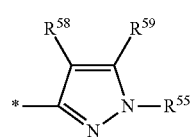 (A-17)
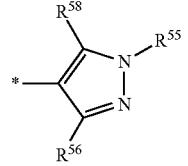 (A-18)
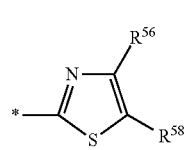 (A-19)
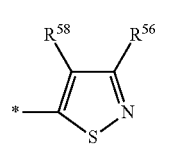 (A-20)
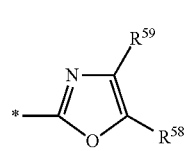 (A-21)
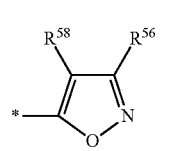 (A-22)
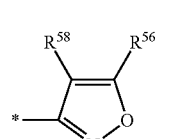 (A-23)
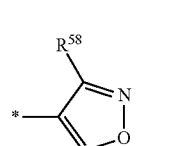 (A-24)
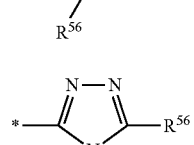 (A-25)
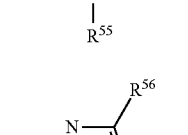 (A-26)

-continued

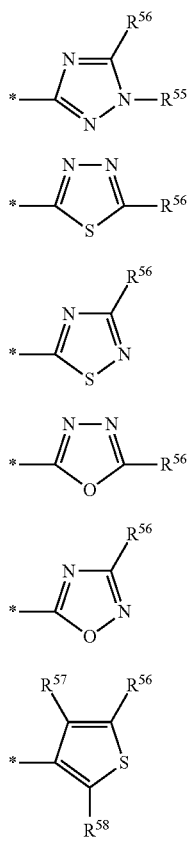

(A-27)
(A-28)
(A-29)
(A-30)
(A-31)
(A-32)

In the present invention, it is also possible to use dyes along with pigments. For example, it is possible to use dyes such as pyrazole azo-based dyes, anilino azo-based dyes, triphenylmethane-based dyes, anthraquinone-based dyes, anthrapyridone-based dyes, benzylidene-based dyes, oxonol-based dyes, pyrazolo triazole azo-based dyes, pyridone azo-based dyes, cyanine-based dyes, phenothiazine-based dyes, pyrrolo pyrazole azo methine-based dyes, xanthene-based dyes, phthalocyanine-based dyes, benzopyran-based dyes, indigo-based dyes, pyrromethene-based dyes, and the like. In addition, a multimer of the dyes may be used.

As other dyes, it is possible to use, for example, the dyes described in JP1989-90403A (JP-S64-90403A), JP1989-91102A (JP-S64-91102A), JP1989-94301A (JP-H1-94301A), JP1994-11614A (JP-H6-11614A), JP2592207B, U.S. Pat. No. 4,808,501A, U.S. Pat. No. 5,667,920A, U.S. Pat. No. 5,059,500A, JP1993-333207A (JP-H5-333207A), JP1994-35183A (JP-H6-35183A), JP1994-51115A (JP-H6-51115A), JP1994-194828A (JP-H6-194828A), JP1996-211599A (JP-H8-211599A), JP1992-249549A (JP-H4-249549A), JP1998-123316A (JP-H10-123316A), JP1999-302283A (JP-H11-302283A), JP1995-286107A (JP-H7-286107A), JP2001-4823A, JP1996-15522A (JP-H8-15522A), JP1996-29771A (JP-H8-29771A), JP1996-146215A (JP-H8-146215A), JP1999-343437A (JP-H11-343437A), JP1996-62416A (JP-H8-62416A), JP2002-14220A, JP2002-14221A, JP2002-14222A, JP2002-14223A, JP1996-302224A (JP-H8-302224A), JP1996-73758A (JP-H8-73758A), JP1996-179120A (JP-H8-179120A), JP1996-151531A (JP-H8-151531A), and the like, the contents of which are included in the present specification.

The content of the pigments in the composition of the present invention is preferably 20 mass % to 80 mass % of the total solid content of the composition of the present invention and more preferably 30 mass % to 70 mass %.

<<(B) Polymer>>

The polymer (B) which is used for the composition of the present invention has at least (b-1) a bulky amine moiety, (b-2) an acid group, and (b-3) a constituent unit derived from a macromonomer having a weight average molecular weight of 1000 to 50000. The polymer (B) which is used for the present invention is able to be used as an additional resin and is preferably used as a dispersant for dispersing the pigment (A).

<<<(b-1) Bulky Amine Moiety>>>

The polymer (B) which is used for the present invention has (b-1) a bulky amine moiety. The bulky amine moiety (b-1) may be bonded with a side chain of the polymer (B) or may be included in the main chain.

The bulky amine moiety (b-1) has a nitrogen atom, carbon atoms $X^1$ bonded with the nitrogen atom, and carbon atoms $Y^1$ bonded with the carbon atoms $X^1$, and the total carbon number of the carbon atoms $X^1$ and the carbon atoms $Y^1$ described above is 7 or more. That is, the bulky amine moiety essentially has a nitrogen atom, carbon atoms, and a hydrogen atom. The bulky amine moiety preferably has an isopropyl structure ($-CH(CH_3)_2$ or $-C(CH_2)_2-$).

In the polymer (B) which is used in the present invention, only one type of the bulky amine moiety may be included, or two or more types may be included.

The total carbon number of the carbon atoms $X^1$ and the carbon atoms $Y^1$ is 7 or more, preferably 8 or more, and more preferably 9 or more. By the total carbon number of carbon atoms being 7 or more, when formed into a coating film, the long-term light resistance in an environment having a low oxygen concentration is favorable. The upper limit of the total carbon number of the carbon atoms $X^1$ and the carbon atoms $Y^1$ is preferably 12 or less and more preferably 10 or less. In addition, the bulky amine moiety (b-1) may have other arbitrary atoms than the nitrogen atom, the carbon atoms $X^1$, and the carbon atoms $Y^1$.

In addition, the bulky amine moiety (b-1) preferably has a cyclic amine structure which includes a nitrogen atom in a ring. By the bulky amine moiety (b-1) having a cyclic amine structure, it is possible to suppress the polymer from deteriorating and yellowing due to heat or light and to make the long-term light resistance in an environment having a low oxygen concentration more favorable when formed into a coating film. The ring in this case is preferably a 5 membered ring or a 6 membered ring and also preferably a ring having a saturated structure.

In particular, the bulky amine moiety (b-1) is preferably represented by General Formula (b-1A) below.

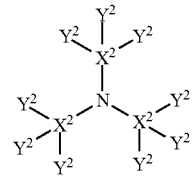

General Formula (b-1A)

(In General Formula (b-1A), $X^2$ are each a hydrogen atom, an oxygen atom, or a carbon atom and $Y^2$ are each an arbitrary atom. However, there is no atom which corresponds to $Y^2$ when $X^2$ is a hydrogen atom. In addition, there is no atom which corresponds to $Y^2$ when $X^2$ is an oxygen atom with a free radical structure. The total carbon number of the carbon atoms of $X^2$ and $Y^2$ is 7 to 12.)

In General Formula (b-1A), at least two of $X^2$ are carbon atoms.

In General Formula (b-1A), $Y^2$ are each an arbitrary atom and preferably either a carbon atom or a hydrogen atom. The total carbon number of the carbon atoms of $Y^2$ is preferably 4 to 7 and preferably 5 or 6. When all of $X^2$ are carbon atoms, at least one of atoms which correspond to $Y^2$ bonded with one $X^2$ may not be present.

The bulky amine moiety (b-1) may form a ring by groups which include $Y^2$ bonding with each other, and preferably forms a ring. In particular, in General Formula (b-1A), it is preferable to include a cyclic amine structure in which at least two of $X^2$'s and a nitrogen atom form a part of the ring structure.

In addition, the bulky amine moiety (b-1) forms a part of the polymer (B) and any atoms of $X^2$ and $Y^2$ are bonded with other moieties directly or indirectly via one or more atoms.

The formula weight of the bulky amine moiety (b-1) is preferably 100 to 400.

The bulky amine moiety (b-1) is preferably a structure which is represented by, for example, General Formulas (b-1-a) to (b-1-e) below. In the bulky amine moiety in Table 1 below, "*" indicates a direct bond with other atoms.

TABLE 1

| | Bulky amine moiety | Number of carbon atoms |
|---|---|---|
| (b-1-a) | 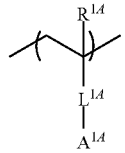 | 9 |
| (b-1-b) | | 8 |
| (b-1-c) | | 8 |
| (b-1-d) | | 8 |
| (b-1-e) | | 7 |

The polymer (B) which is used in the present invention preferably includes the bulky amine moiety (b-1) in a constituent unit which is represented by General Formula (b-1B) below. Only one type of the constituent unit which is represented by General Formula (b-1B) may be included in the polymer (B), or two or more types may be included.

General Formula (b-1B)

(In General Formula (b-1B), $R^{1A}$ represents a hydrogen atom or a methyl group. $L^{1A}$ represents a single bond or a divalent linking group. $A^{1A}$ represents the bulky amine moiety (b-1).)

In General Formula (b-1B), in a case where $L^{1A}$ represents a divalent linking group, examples of the divalent linking group include at least one type selected from an alkylene group with 2 to 10 carbon atoms, an arylene group with 6 to 12 carbon atoms, and a heteroarylene group, or a group formed of a combination of these groups and at least one type of group selected from —NH—, —CONH—, —CO$_2$—, —SO$_2$NH—, —O—, —S—, and —SO$_2$—, and an alkylene group with 2 to 10 carbon atoms, an arylene group with 6 to 12 carbon atoms, —CO$_2$—, —O—, —CONH—, or a group formed in combination with at least one type of group selected therefrom is preferable, and —CO$_2$— is more preferable.

Specific examples of the constituent unit which has the bulky amine moiety (b-1) which is used in the present invention will be shown below; however, the present invention is not limited thereto. In the specific examples below, from the point of view of a more favorable long-term light resistance in an environment having a low oxygen concentration when formed into a coating film, (L-1), (L-3), and (L-5) are preferable, and (L-1) and (L-3) are more preferable. In the specific examples below, $R^x$ represents a hydrogen atom or a methyl group.

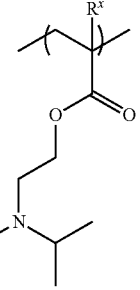

(L-1)

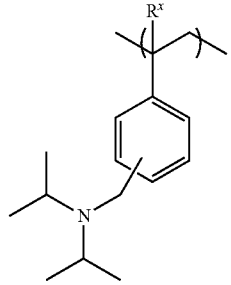

(L-2)

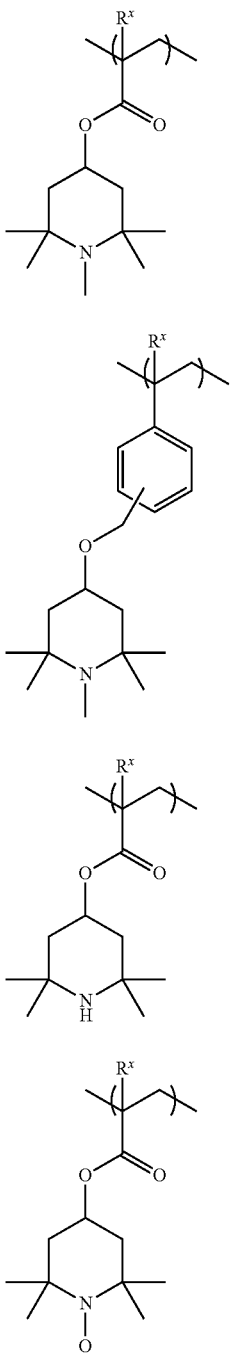

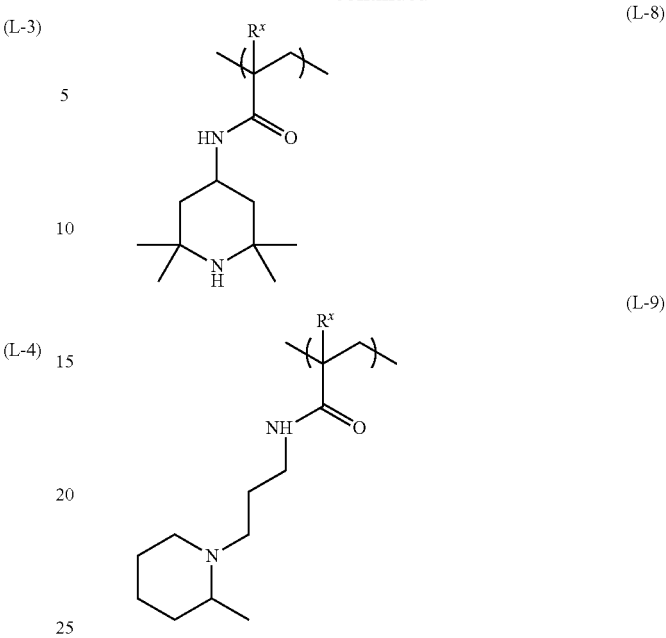

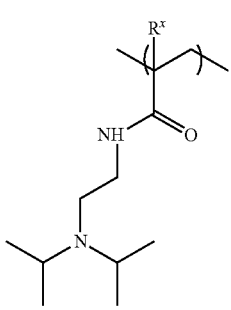

<<<(b-2) Acid Group>>>

The acid dissociation constant (pKa) of the acid group (b-2) in water is preferably 10 or less, and the acid group (b-2) is preferably at least one type selected from a carboxyl group, a sulfonic acid group, a phosphoric acid group, an acetoacetyl group, and a phenol group. From the point of view of the dispersion stability, a carboxyl group is more preferable. The acid group (b-2) which is included in the polymer (B) may be only one type, or may be two or more types.

The acid group (b-2) is generally preferably included in the polymer (B) as a constituent unit which has an acid group in the side chain, and more preferably included as a constituent unit which is represented by General Formula (b-2A) below. Only one type of the constituent unit which has the acid group (b-2) may be included, or two or more types may be included.

General Formula (b-2A)

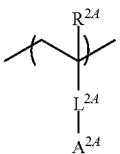

(In General Formula (b-2A), $R^{2A}$ represents a hydrogen atom or a methyl group. $L^{2A}$ represents a single bond or a divalent linking group. $A^{2A}$ represents the acid group (b-2).)

In General Formula (b-2A), $L^{2A}$ is preferably a single bond. In a case where $L^{2A}$ represents a divalent linking group, examples of the divalent linking group include at least one type selected from an alkylene group with 2 to 10 carbon atoms, an arylene group with 6 to 12 carbon atoms, and a heteroarylene group, or a group formed of a combination of these groups and at least one type of group selected from —NH—, —CO—, —CONH—, —CO$_2$—, —SO$_2$NH—, —O—, —S—, and —SO$_2$—, and an alkylene group with 2 to 10 carbon atoms, an arylene group with 6 to 12 carbon atoms, —CO$_2$—, —CO—, —O—, —CONH—, or a group formed in combination with at least one type of group selected therefrom is preferable.

Specific examples of the constituent unit which has the acid group (b-2) which is used for the present invention will be given below; however, the present invention is not limited thereto. Among the specific examples below, from the point of view of the dispersion stability of the pigment and the developing property exhibited by the colored photosensitive composition which uses the pigment dispersion, out of Specific Examples (M-1) to (M-17), Specific Examples (M-4), (M-10), (M-13), and (M-17) are preferable, and (M-4) and (M-13) are more preferable.

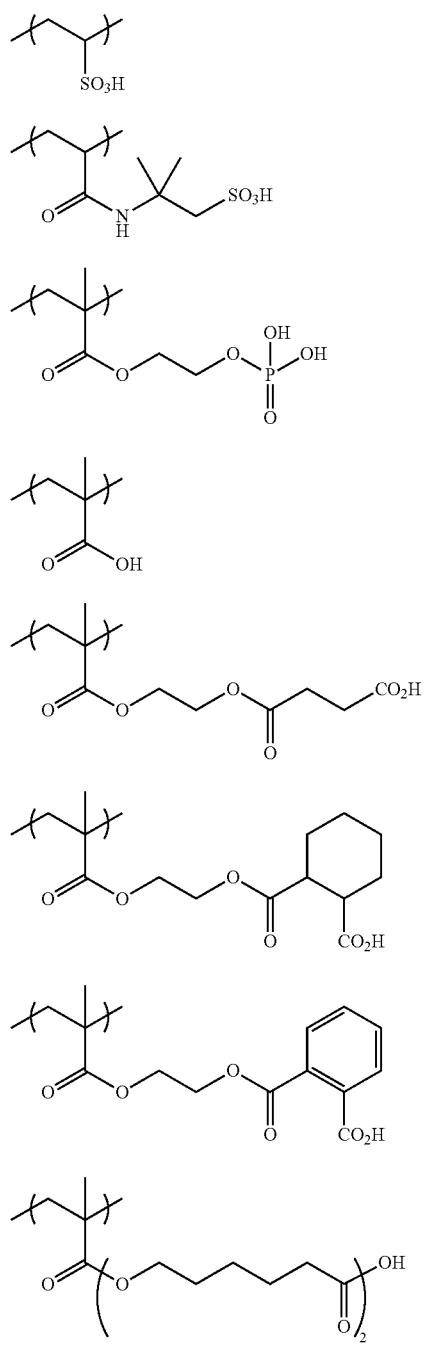

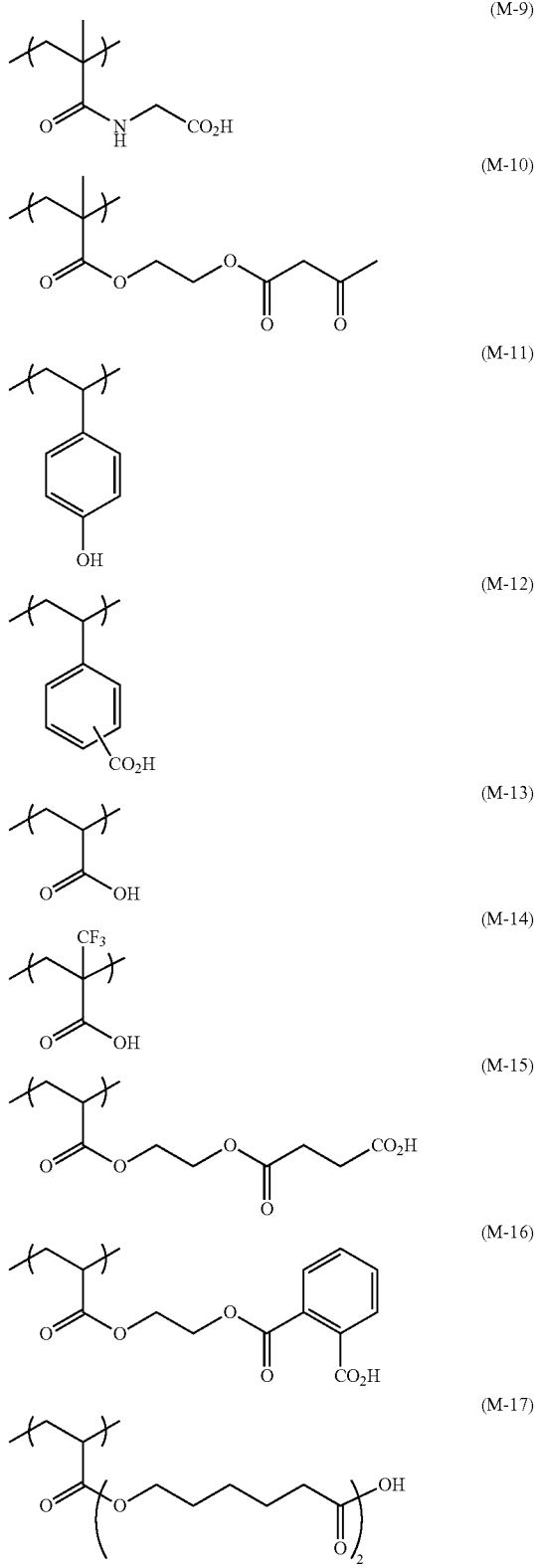

<<<(b-3) Constituent Unit Derived from a Macromonomer Having a Weight Average Molecular Weight of 1000 to 50000>>>

The constituent unit (b-3) derived from a macromonomer having a weight average molecular weight of 1000 to 50000

(also referred to below as a "macromonomer (N)") is not particularly limited as long as the constituent unit has this weight average molecular weight; however, a constituent unit derived from an ethylenically unsaturated monomer is preferable.

Only one type of the constituent unit derived from a macromonomer (N) may be included in the polymer, or two or more types may be included.

The weight average molecular weight of the constituent unit derived from a macromonomer (N) is 1000 to 50000, preferably 1000 to 20000, more preferably 2000 to 10000, and particularly preferably 2000 to 5000. By the weight average molecular weight of the constituent unit derived from a macromonomer (N) being in these ranges, it is possible to improve the dispersibility and dispersion stability of the pigment and the developing property exhibited by the colored photosensitive composition which uses the pigment dispersion. The weight average molecular weight and the number average molecular weight of the constituent unit derived from the macromonomer (N) are defined as polystyrene converted values according to GPC measurement. It is possible to obtain the weight average molecular weight (Mw) and the number average molecular weight (Mn) of the constituent unit derived from the macromonomer (N), for example, by using HLC-8220 (manufactured by Tosoh Corporation), using TSKgel Super AWM-H (manufactured by Tosoh Corporation, 6.0 mmID×15.0 cm) as the columns, and using a 10 mmol/L lithium bromide NMP (N-methylpyrrolidinone) solution as an eluent.

The constituent unit derived from the macromonomer (N) is preferably a constituent unit derived from a polyester-based macromonomer which is excellent in flexibility and in terms of the compatibility with a solvent from the point of view of the dispersibility and dispersion stability of a pigment and the developing property exhibited by the colored photosensitive composition which uses the pigment dispersion.

The constituent unit derived from the macromonomer (N) is preferably represented by General Formula (b-3A) below, more preferably represented by General Formula (b-3B) below, and even more preferably represented by General Formula (b-3C) below.

The constituent unit derived from the macromonomer (N) which is included in the polymer (B) may be only one type, or may be two or more types.

General Formula (b-3A)

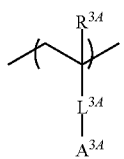

(In General Formula (b-3A), $R^{3A}$ represents a hydrogen atom or a methyl group. $L^{3A}$ represents a single bond or a divalent linking group. $A^{3A}$ represents a moiety (b-3) having a weight average molecular weight of 1000 to 50000.)

In General Formula (b-3A), in a case where $L^{3A}$ represents a divalent linking group, examples of the divalent linking group include at least one type selected from an alkylene group, an arylene group, and a heteroarylene group, or a group formed of a combination of these groups and at least one type of group selected from —NH—, —CO—, —CONH—, —CO$_2$—, —SO$_2$NH—, —O—, —S—, and —SO$_2$—, and a group formed of a combination of an alkylene group, —CO$_2$—, —CO—, and —CONH— is particularly preferable.

General Formula (b-3B)

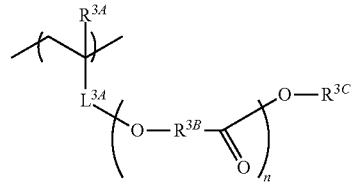

(In General Formula (b-3B), $R^{3A}$ represents a hydrogen atom or a methyl group. $L^{3A}$ represents a single bond or a divalent linking group. $R^{3B}$ represents an alkylene group. $R^3$ represents an alkyl group. n represents an integer of 5 to 100.)

In General Formula (b-3B), $L^{3A}$ has the same meaning as $L^{3A}$ in General Formula (b-3A) described above and the preferable ranges thereof are also the same.

In General Formula (b-3B), $R^{3B}$ is preferably a straight-chain or branched alkylene group with 1 to 10 carbon atoms, more preferably a straight-chain alkylene group with 1 to 10 carbon atoms, even more preferably an unsubstituted straight-chain alkylene group with 5 to 20 carbon atoms, and particularly preferably —(CH$_2$)$_5$—.

In General Formula (b-3B), $R^{3C}$ is preferably a straight-chain or branched alkyl group with 5 to 20 carbon atoms.

In General Formula (b-3B), n represents an integer of 5 to 100 and is preferably an integer of 5 to 80.

General Formula (b-3C)

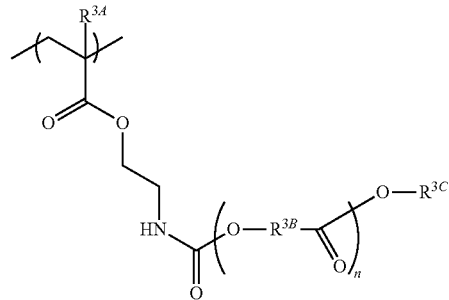

(In General Formula (b-3C), $R^{3A}$ represents a hydrogen atom or a methyl group. $R^{3B}$ represents an alkylene group. $R^{3C}$ represents an alkyl group. n represents an integer of 5 to 100.)

In General Formula (b-3C), $R^{3A}$, $R^{3B}$, $R^{3C}$, and n have the same meaning as $R^{3A}$, $R^{3B}$, $R^{3C}$, and n in General Formula (b-3B) described above and the preferable ranges thereof are also the same.

Specific examples of the constituent unit derived from the macromonomer (N) which is used for the present invention will be given below; however, the present invention is not limited thereto.

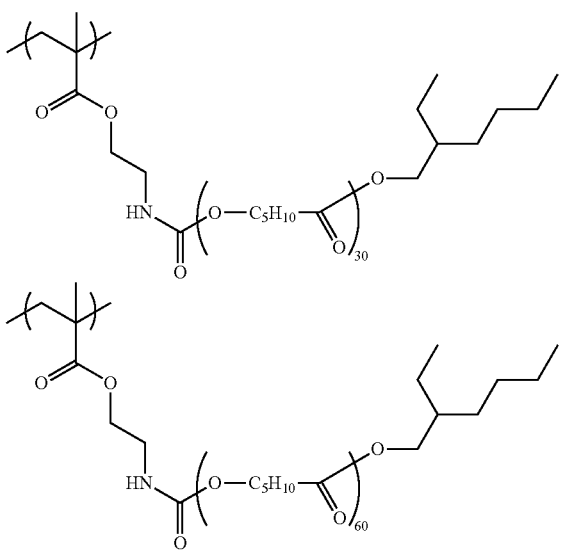

<< Preferable Form of Polymer (B)>>

The polymer (B) is preferably represented by General Formula (B-1) below.

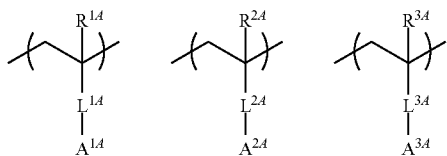

General Formula (B-1)

(In General Formula (B-1), $R^{1A}$ to $R^{3A}$ each independently represent a hydrogen atom or a methyl group. $L^{1A}$ to $L^{3A}$ each independently represent a single bond or a divalent linking group. $A^{1A}$ represents the bulky amine moiety (b-1). $A^{2A}$ represents the acid group (b-2). $A^{3A}$ represents a moiety (b-3) having a weight average molecular weight of 1000 to 50000.)

In General Formula (B-1), $R^{1A}$ to $R^{3A}$, $L^{1A}$ to $L^{3A}$, and $A^{1A}$ to $A^{3A}$ have the same meaning as $R^{1A}$ to $R^{3A}$, $L^{1A}$ to $L^{3A}$, and $A^{1A}$ to $A^{3A}$ in General Formula (b-1B), General Formula (b-2A), and General Formulas (b-3A) to (b-3C) described above and the preferable ranges thereof are also the same.

The acid value of the polymer (B) is preferably 15 mgKOH/g to 250 mgKOH/g, more preferably 20 mgKOH/g to 150 mgKOH/g, and even more preferably 40 mgKOH/g to 100 mgKOH/g. By the acid value of the polymer (B) being in these ranges, it is possible to further improve the dispersibility and dispersion stability of the pigment and the developing property exhibited by the colored photosensitive composition which uses the pigment dispersion. It is possible to measure the acid value of the polymer (B) by base titration.

The amine value of the polymer (B) is preferably 0.2 mmol/g to 2.5 mmol/g, more preferably 0.5 mmol/g to 2.0 mmol/g, and even more preferably 0.8 mmol/g to 1.8 mmol/g. By the amine value of the polymer (B) being in these ranges, it is possible to further improve the dispersibility and dispersion stability of the pigment.

The amine value (B) refers to a value which is calculated by the method below.

A measuring sample is dissolved in acetic acid and the obtained solution is neutralized and titrated with a 0.1 M perchloric acid/acetic acid solution using a potentiometric titrator (trade name: AT-510, manufactured by Kyoto Electronics Manufacturing Co., Ltd.). The inflection point of a titration pH curved line is set as the titration end point and the amine value (B) is calculated using the following formula.

$$B = V_s \times 0.1 \times f/w$$

B: Amine value (mmol/g)

Vs: Usage amount (mL) of 0.1 M perchloric acid/acetic acid solution needed for titration f: Titer of 0.1 M perchloric acid/acetic acid solution w: Weight (g) of measuring sample (solid content conversion)

The constituent unit which has the bulky amine moiety (b-1) is preferably 20 mol % to 80 mol % of all of the constituent units in the polymer (B), more preferably 20 mol % to 70 mol %, even more preferably 30 mol % to 70 mol %, and particularly preferably 35 mol % to 65 mol %. In addition, the constituent unit which has the bulky amine moiety (b-1) is preferably included such that the amine value of the polymer (B) is in the ranges described above. By the content of the constituent unit which has the bulky amine moiety (b-1) being in these ranges, it is possible to make the long-term light resistance more favorable in an environment having a low oxygen concentration when the composition is formed into a coating film while maintaining the dispersibility and dispersion stability of a pigment.

The constituent unit which has the acid group (b-2) is preferably 20 mol % to 80 mol % of all of the constituent units in the polymer (B), more preferably 25 mol % to 65 mol %, and even more preferably 25 mol % to 50 mol %. In addition, the constituent unit which has the acid group (b-2) is preferably included such that the acid value of the polymer (B) is in the ranges described above.

The constituent unit (b-3) derived from the macromonomer (N) is preferably 1 mol % to 40 mol % of all of the constituent units in the polymer (B), more preferably 1 mol % to 20 mol %, and even more preferably 1 mol % to 10 mol %. By the content of the constituent unit derived from the macromonomer (N) being in these ranges, it is possible to further improve the dispersibility and dispersion stability of the pigment and the developing property exhibited by the colored photosensitive composition which uses the pigment dispersion.

In the polymer (B), the content ratio ((b-1):(b-2):(b-3)) of (b-1) the constituent unit which has the bulky amine moiety, (b-2) the constituent unit which has the acid group, and (b-3) the constituent unit derived from a macromonomer is preferably a mass ratio of 5 to 50:2 to 30:30 to 80, more preferably 20 to 50:5 to 20:40 to 70, and even more preferably 20 to 40:8 to 20:40 to 60.

In addition, the polymer (B) may have other constituent units than the constituent units described above. Examples of the other constituent units include constituent units derived from alkyl (meth)acrylate, cycloalkyl (meth)acrylate, aralkyl (meth)acrylate, (meth)acrylic acid amide, 2-hydroxyethyl (meth)acrylate, styrene, or the like in order to improve the degree of solubility in a solvent or the coating property.

The other constituent units are preferably 30 mol % or less of all of the constituent units in the polymer (B) and more preferably 15 mol % or less.

A polymerizable group may be introduced to the polymer (B) in order to improve the curability. In this case, for example, it is possible to use methods known in the art such as a method in which (meth)acrylate which contains an epoxy group (for example, glycidyl methacrylate and the like) is reacted with a carboxyl group, a method in which (meth)acrylate which contains a hydroxyl group and an isocyanate group or cyclic acid anhydride which contains a polymerizable group is reacted, and the like.

The weight average molecular weight of the polymer (B) is preferably 5000 to 50000, more preferably 7000 to 25000, and even more preferably 10000 to 20000. By the weight average molecular weight of the polymer (B) being in these ranges, it is possible to make the long-term light resistance and the transparency in an environment having a low oxygen concentration more favorable when the composition is formed into a coating film while maintaining the dispersibility and dispersion stability of a pigment.

The weight average molecular weight and the dispersity of the polymer (B) are defined as polystyrene converted values according to GPC measurement. It is possible to obtain the weight average molecular weight (Mw) and the number average molecular weight (Mn) of the polymer (B), for example, using the same measuring method as for the weight average molecular weight and the number average molecular weight of the constituent unit derived from a macromonomer (N).

<<Method for Producing Polymer (B)>>

It is possible to produce the polymer (B) by using and copolymerizing a monomer which has a bulky amine moiety, a monomer which has an acid group, a macromonomer (N), and other arbitrary monomers as necessary as a raw material substance.

The monomer which has a bulky amine moiety is preferably a (meth)acryl-based monomer and/or a styrene-based monomer.

The monomer which has an acid group is preferably, for example, a monomer known in the art which has at least one acid group (b-1) and of which the molecular weight is 50 to 800.

The macromonomer (N) preferably has a polymerizable group at an end and, for example, it is possible to use macromonomers known in the art. Examples of the macromonomer known in the art include Macromonomer AA-6 (methyl polymethacrylate of which the end group is a methacryloyl group), AS-6 (polystyrene of which the end group is a methacryloyl group), AN-6S (a copolymer of styrene and acrylonitrile of which the end group is a methacryloyl group), and AB-6 (butyl polyacrylate of which the end group is a methacryloyl group) produced by Toagosei Co., Ltd., PLACCEL FM5 (a ε-caprolactone 5 mol equivalent added product of 2-hydroxyethyl methacrylate) and FA10L (a ε-caprolactone 10 mol equivalent added product of 2-hydroxyethyl methacrylate) produced by Daicel Corporation, the polyester-based macromonomers described in JP1990-272009A (JP-H2-272009A), Blemmer PME series (methoxy polyethylene glycol monomethacrylate) and Blemmer PSE series (stearoxy polyethylene glycol monomethacrylate) produced by NOF Corporation, and the like.

The polymer (B) is preferably produced by radical polymerization (a radical polymerization method) using a monomer which has a bulky amine moiety, a monomer which has an acid group, a macromonomer (N), and other arbitrary monomers as necessary as the raw material substances. The polymerization conditions such as the temperature, the pressure, the type of radical initiator and the amount thereof, and the type of solvent when producing the polymer (B) using the radical polymerization method are the same as in normal methods.

It is also possible to produce the polymer (B), for example, by reacting a compound which has a hindered amine moiety after carrying out copolymerization using a monomer which has an acid group, a macromonomer (N), and other arbitrary monomers as necessary (polymer reaction method). Specific examples of the polymer (B) using the polymer reaction method include the resin (B-21) and the like which are shown in Examples which will be described below along with Synthesis Examples; however, the present invention is not limited thereto.

It is possible to use, for example, the monomers described in paragraphs "0164" to "0171" in JP2007-277514A as other monomers than the monomer which has a bulky amine moiety, the monomer which has an acid group, and the macromonomer (N), and the contents thereof are included in the present specification.

<<Solvent>>

Examples of the solvent which is used in the present invention include the following.

Examples of esters include ethyl acetate, n-butyl acetate, isobutyl acetate, amyl formate, isoamyl acetate, isobutyl acetate, cyclohexyl acetate, butyl propionate, isopropyl butyrate, ethyl butyrate, butyl butyrate, methyl lactate, ethyl lactate, alkyl oxyacetate (examples: methyl oxyacetate, ethyl oxyacetate, butyl oxyacetate (for example, methyl methoxyacetate, ethyl methoxyacetate, butyl methoxyacetate, methyl ethoxyacetate, ethyl ethoxyacetate, and the like)), alkyl 3-oxypropionate esters (examples: methyl 3-oxypropionate, ethyl 3-oxypropionate, and the like (for example, methyl 3-methoxypropionate, ethyl 3-methoxypropionate, methyl 3-ethoxypropionate, ethyl 3-ethoxypropionate, and the like)), alkyl 2-oxypropionate esters (examples: methyl 2-oxypropionate, ethyl 2-oxypropionate, propyl 2-oxypropionate, and the like (for example, methyl 2-methoxypropionate, ethyl 2-methoxypropionate, propyl 2-methoxypropionate, methyl 2-ethoxypropionate, and ethyl 2-ethoxypropionate)), methyl 2-oxy-2-methylpropionate and ethyl 2-oxy-2-methylpropionate (for example, methyl 2-methoxy-2-methylpropionate, ethyl 2-ethoxy-2-methylpropionate, and the like), methyl pyruvate, ethyl pyruvate, propyl pyruvate, methyl acetoacetate, ethyl acetoacetate, methyl 2-oxobutanoate, ethyl 2-oxobutanoate, and the like.

Examples of ethers include diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol monomethyl ether (MFG), propylene glycol methyl ether acetate (PGMEA), propylene glycol monoethyl ether acetate, propylene glycol monopropyl ether acetate, and the like.

Examples of ketones include methylethyl ketone, cyclohexanone, 2-heptanone, 3-heptanone, and the like.

Examples of aromatic hydrocarbons include toluene, xylene, and the like.

Among these, methyl 3-ethoxypropionate, ethyl 3-ethoxypropionate, ethyl cellosolve acetate, ethyl lactate, diethylene glycol dimethyl ether, butyl acetate, methyl 3-methoxypropionate, propylene glycol monomethyl ether, 2-heptanone, cyclohexanone, propylene glycol methyl ether acetate, and the like are favorable.

The solvent may be used individually or may be used in a combination of two or more types.

In a case where the composition of the present invention includes a solvent, the content thereof is preferably 50 mass % to 95 mass % of the composition and more preferably 60 mass % to 90 mass %.

<<<Pigment Derivative>>>

The pigment derivative is a compound which has a structure in which a portion of an organic pigment is substituted with an acidic group, a basic group, or a phthalimidomethyl group. From the point of view of the dispersibility and dispersion stability of the pigment, the pigment derivative preferably contains a pigment derivative which has an acidic group or a basic group and more preferably contains a pigment derivative which has at least one type of acidic group. In particular, the effects of the present invention are effectively exhibited by using a pigment derivative in a combination with the pigment (A) described above.

Examples of the organic pigment for forming the pigment derivative include a diketopyrrolopyrrole-based pigment, an azo-based pigment, a phthalocyanine-based pigment, an anthraquinone-based pigment, a quinacridone-based pigment, a dioxazine-based pigment, a perinone-based pigment, a perylene-based pigment, a thioindigo-based pigment, an isoindoline-based pigment, an isoindolinone-based pigment, a quinophthalone-based pigment, an indanthrene-based pigment, a metal complex-based pigment, and the like.

In addition, the acidic group of the pigment derivative is preferably sulfonic acid, carboxylic acid, or salts thereof (the salts are preferably quaternary ammonium salts such as tetramethyl ammonium salt and tetrabutyl ammonium salt), more preferably a carboxylic acid group or a sulfonic acid group, and particularly preferably a sulfonic acid group. The basic group of the pigment derivative is preferably an amino group and particularly preferably a tertiary amino group.

The pigment derivative is preferably a quinoline-based, a benzimidazolone-based, or isoindoline-based pigment derivative in particular, and more preferably a quinoline-based or benzimidazolone-based pigment derivative. In particular, the pigment derivative which has the structure below is preferable.

In General Formula (P), A represents a partial structure selected from General Formulas (PA-1) to (PA-3) below. B represents a single bond or a (t+1) valent linking group. C represents a single bond, —NH—, —CONH—, —CO$_2$—, —SO$_2$NH—, —O—, —S—, or —SO$_2$—. D represents a single bond, an alkylene group, a cycloalkylene group, or an arylene group. E represents —SO$_3$H, —SO$_3$M (M represents an alkali metal atom), —CO$_2$H, or N(Rpa)(Rpb). Rpa and Rpb each independently represent an alkyl group or an aryl group and Rpa and Rpb may be linked with each other to form a ring. t represents an integer of 1 to 5.

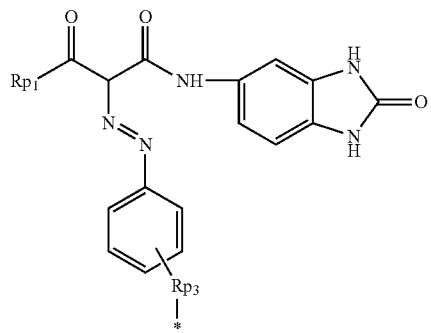

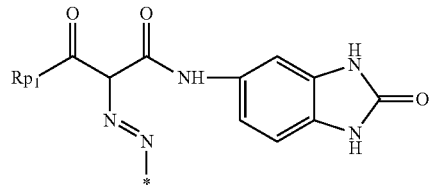

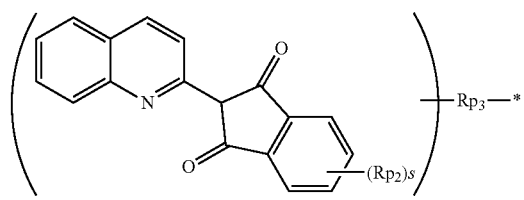

In General Formulas (PA-1) and (PA-2), $Rp_1$ represents an alkyl group with 1 to 5 carbon atoms or an aryl group. In General Formula (PA-3), $Rp_2$ represents a hydrogen atom, a halogen atom, an alkyl group, or a hydroxyl group. s represents an integer of 1 to 4. In a case where s is 2 or more, the plurality of $Rp_2$ may be the same as each other or may be different. In General Formula (PA-1) and General Formula (PA-3), $Rp_a$ represents a single bond, —NH—, —CONH—, —CO$_2$—, —SO$_2$NH—, —O—, —S—, or —SO$_2$—. * represents a linking section with B in General Formula (P).

In General Formulas (PA-1) and (PA-2), $Rp_1$ is preferably a methyl group or a phenyl group in particular, and most preferably a methyl group. In General Formula (PA-3), $Rp_2$ is preferably a hydrogen atom or a halogen atom and most preferably a hydrogen atom or a chlorine atom.

In General Formula (P), examples of the (t+1) valent linking group which is represented by B include an alkylene group, a cycloalkylene group, an arylene group, and a heteroarylene group. Among these, a linking group which is represented by Structural Formulas (PA-4) to (PA-9) below is particularly preferable.

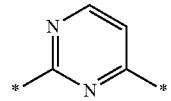

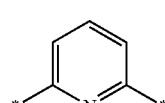

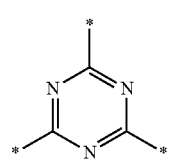

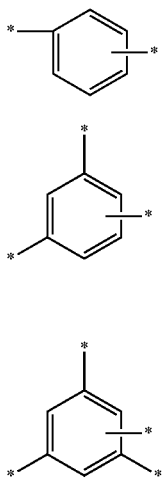

(PA-7)

(PA-8)

(PA-9)

In Structural Formulas (PA-4) to (PA-9), a pigment derivative which has a linking group which is represented by Structural Formulas (PA-5) or (PA-8) as B is particularly preferable due to having superior dispersibility.

In General Formula (P), examples of the alkylene group, the cycloalkylene group, and the arylene group which are represented by D include methylene, ethylene, propylene, butylene, pentylene, hexylene, decylene, cyclopropylene, cyclobutylene, cyclopentylene, cyclohexylene, cyclooctylene, cyclodecylene, phenylene, naphthylene, and the like. Among these, D is particularly preferably an alkylene group and more preferably an alkylene group with 1 to 5 carbon atoms.

In General Formula (P), in a case where E represents —N(Rpa)(Rpb), it is possible for examples of the alkyl group and the aryl group in Rpa and Rpb to include a methyl group, an ethyl group, a propyl group, an isopropyl group, a butyl group, a sec-butyl group, a tert-butyl group, a pentyl group, an isopentyl group, a neopentyl group, a hexyl group, an octyl group, a decyl group, a cyclopropyl group, a cyclobutyl group, a cyclopentyl group, a cyclohexyl group, a cyclooctyl group, a cyclodecyl group, a phenyl group, a naphthyl group, and the like. Rpa and Rpb are particularly preferably an alkyl group and most preferably an alkyl group with 1 to 5 carbon atoms. In General Formula (P), t is preferably 1 or 2.

Specific examples of the pigment derivative will be given below; however, the present invention is not limited thereto.

Out of the pigment derivatives below, (A-6) to (A-9), (A-12) to (A-14), (A-18), (A-30), and (A-31) are preferable, (A-9) and (A-31) are more preferable, and (A-9) is particularly preferable.

For other pigment derivatives, it is possible to refer to the description in the paragraphs "0162" to "0183" in JP2011-252065A and the contents thereof are included in the present specification.

(A-1)

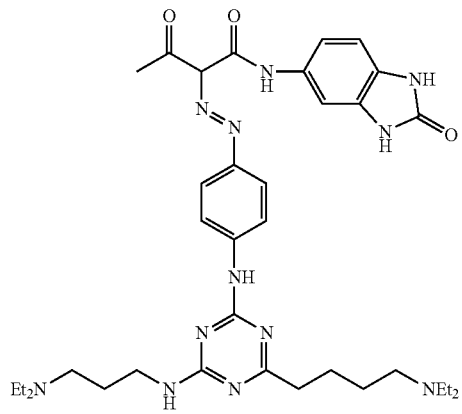

(A-2)

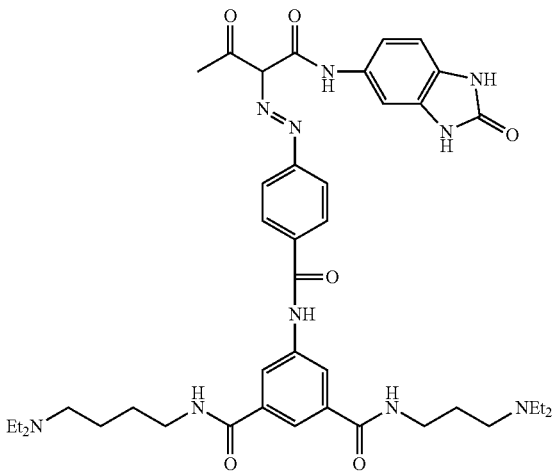

(A-3)

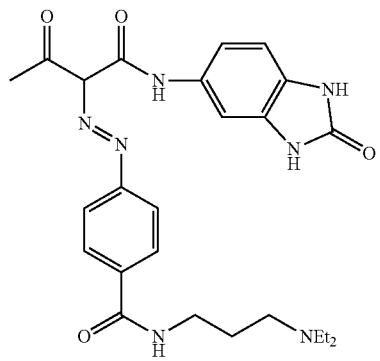

(A-4)

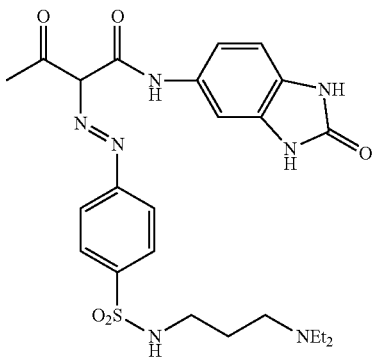

-continued
(A-5)
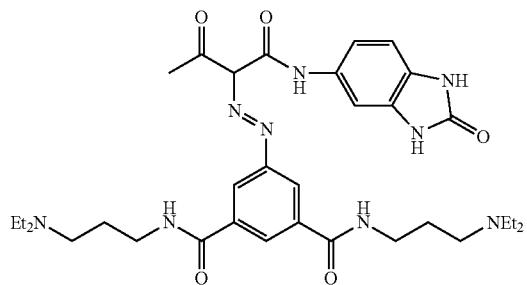
(A-6)
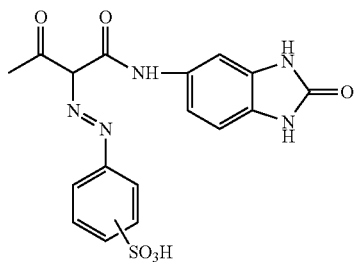
(A-7)
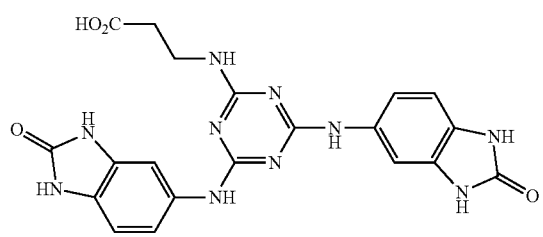
(A-8)
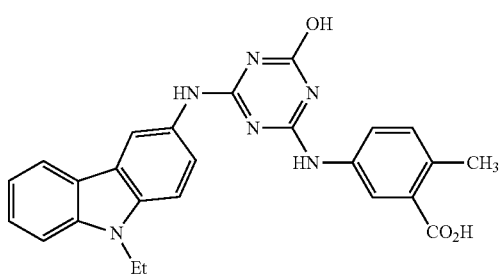
(A-9)
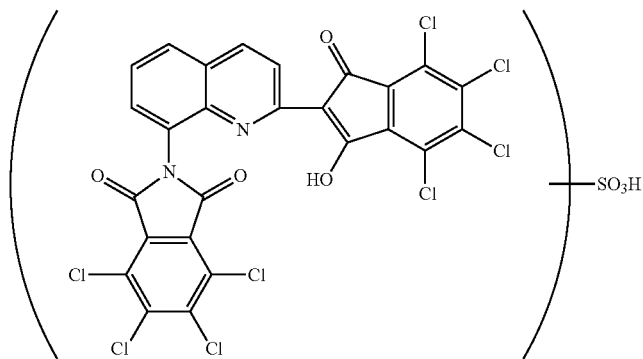
(A-10)
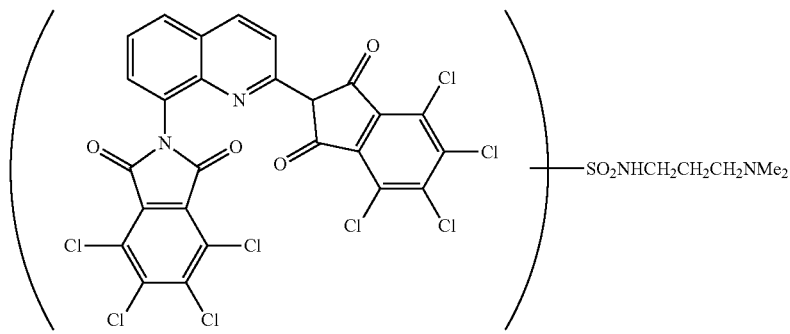
(A-11)
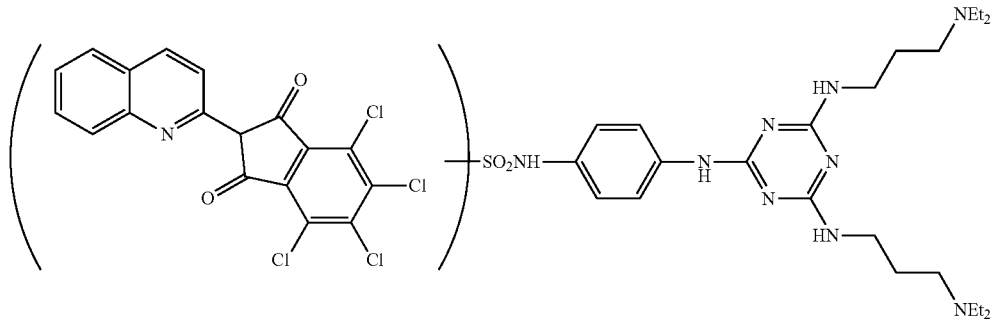

-continued
(A-12)
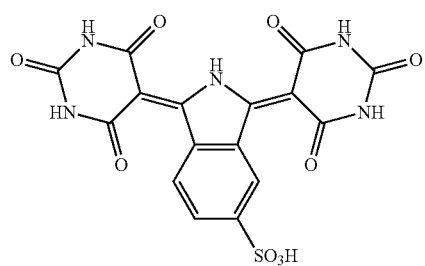
(A-13)
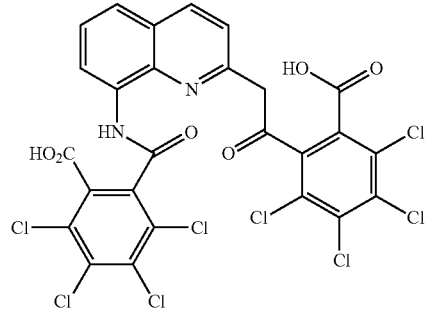
(A-14)
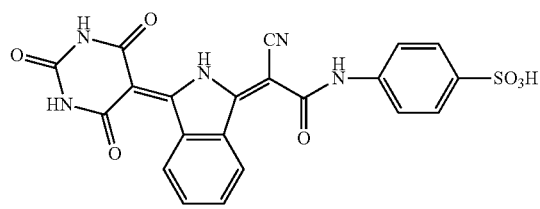
(A-15)
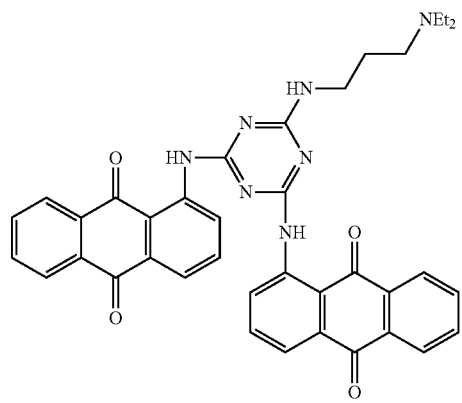
(A-16)
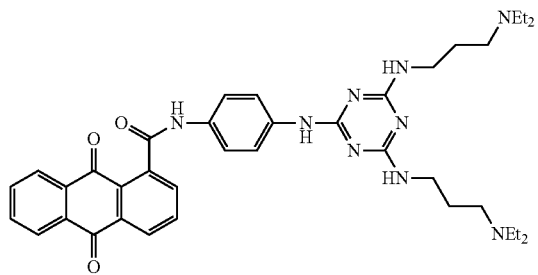
(A-17)
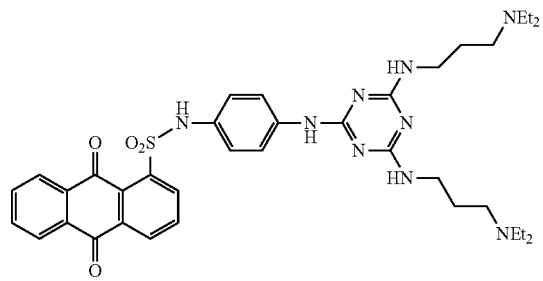
(A-18)
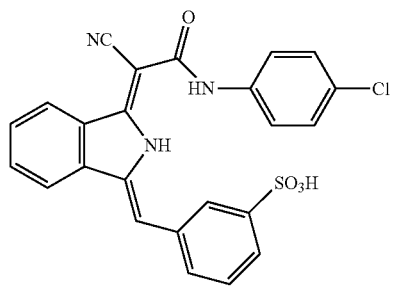
(A-19)
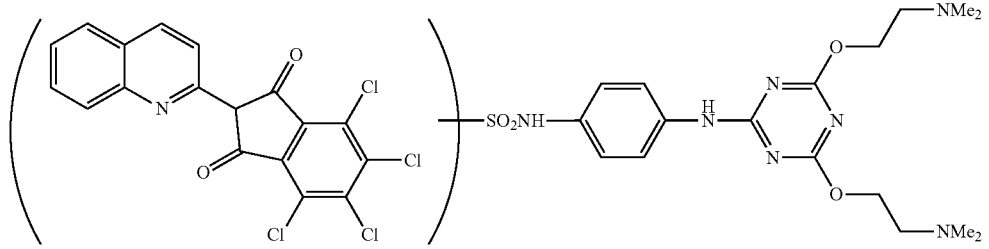

-continued
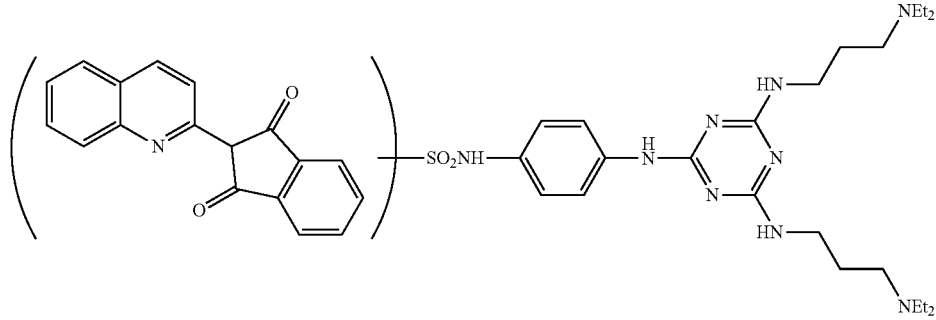
(A-20)
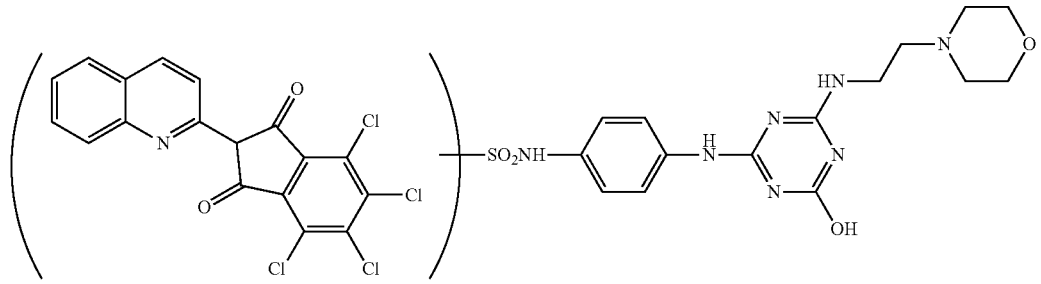
(A-21)
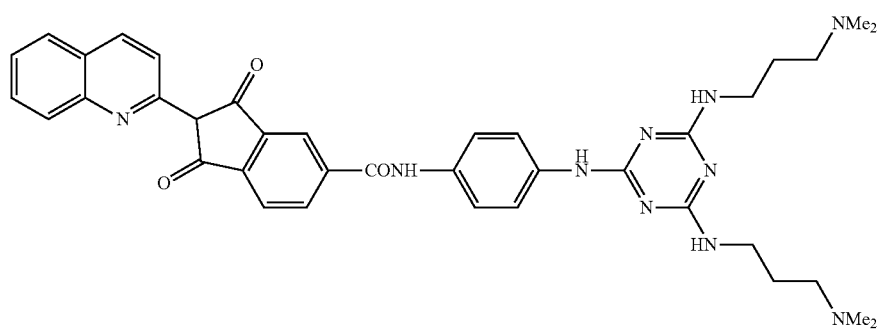
(A-22)
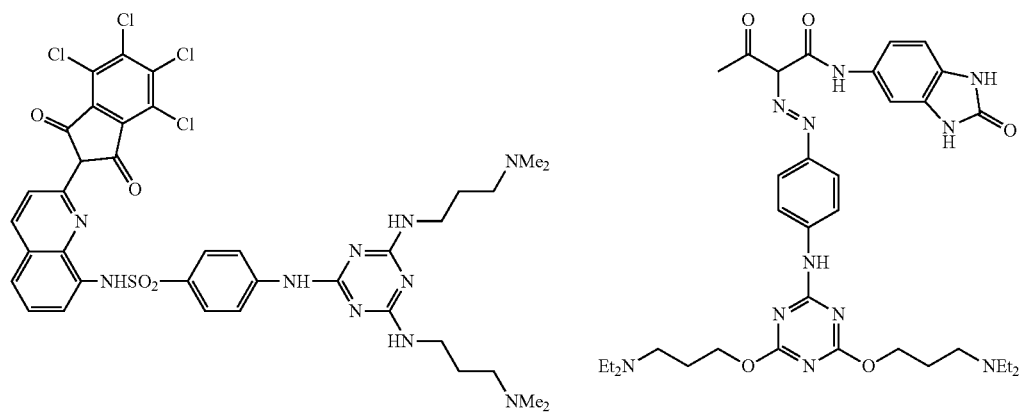
(A-23) (A-24)

-continued
(A-25)
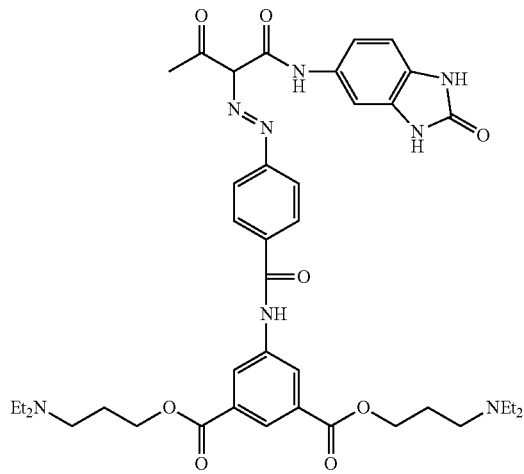
(A-26)
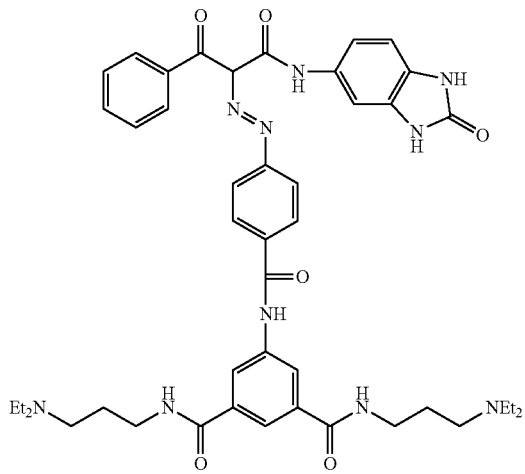
(A-27)
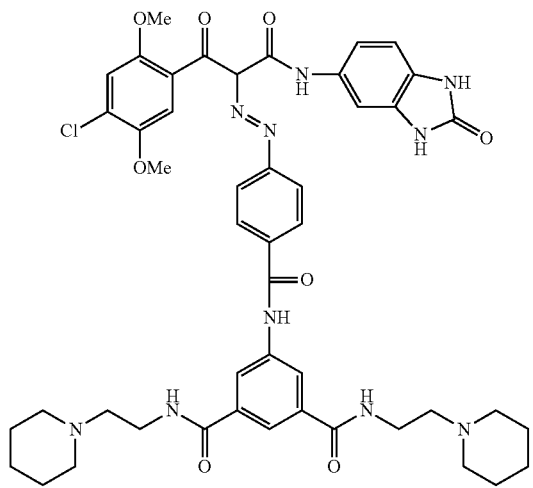
(A-28)
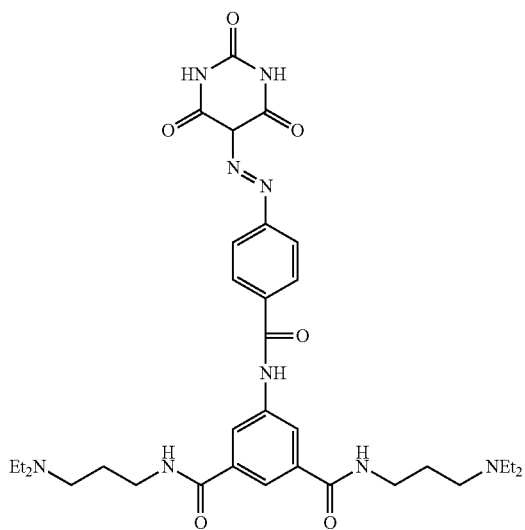
(A-29)
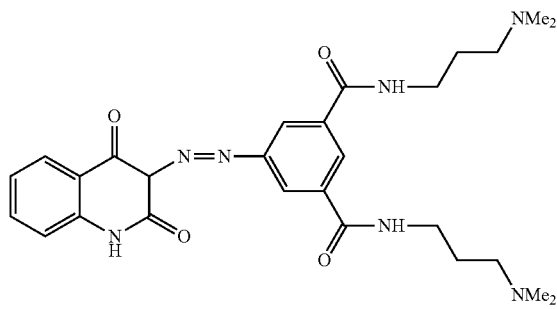
(A-30)
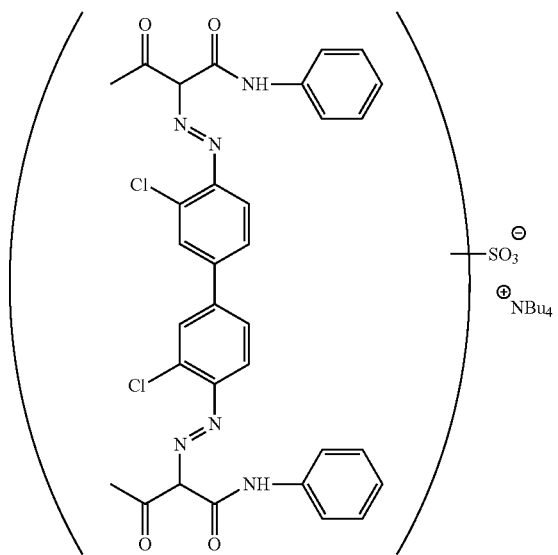

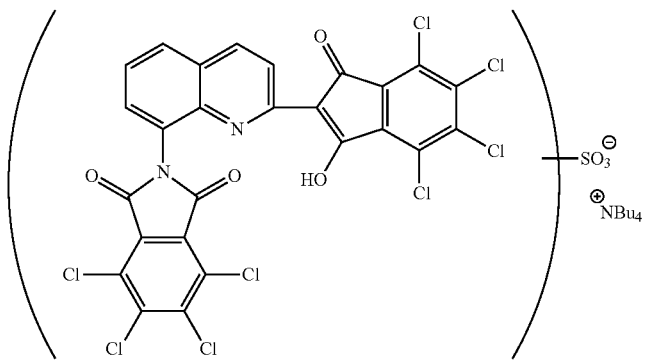
(A-31)

The content of the pigment derivative in the composition of the present invention is preferably 1 mass % to 30 mass % with respect to the total mass of the pigments and more preferably 3 mass % to 20 mass %. Only one type of the pigment derivative may be used or two or more types may be used together.

<<Photopolymerizable Compound>>

The photopolymerizable compound is preferably, for example, a compound which has at least one addition-polymerizable ethylenically unsaturated group and of which the boiling point is 100° C. or higher under normal pressure, and more preferably a tetrafunctional or higher acrylate compound among these. Examples thereof include hexaacrylates (produced by Shin-Nakamura Chemical Co., Ltd.: A-DPH-6E, A-DPH-12E, and A-DPH-6P). The photopolymerizable compound may be only one type or two or more types may be used together.

For the photopolymerizable compound, it is possible to refer to the description in paragraphs "0129" to "0136" in JP2011-137125A and the contents thereof are included in the present specification.

The content of the photopolymerizable compound in the composition of the present invention is preferably 0.01 mass % to 10 mass % with respect to the total solid content of the composition of the present invention, and more preferably 0.1 mass % to 3 mass %.

<<Photopolymerization Initiator>>

It is possible to appropriately select a photopolymerization initiator from the photopolymerization initiators known in the art. The photopolymerization initiator may be only one type or two or more types may be used together.

Examples of the photopolymerization initiator include halogenated hydrocarbon derivatives (for example, a halogenated hydrocarbon derivative which has a triazine skeleton, a halogenated hydrocarbon derivative which has an oxadiazole skeleton, and the like), an acyl phosphine compound such as acyl phosphine oxide, hexaarylbiimidazole, oxime compounds such as an oxime derivative, organic peroxide, thio compounds, ketone compounds, aromatic onium salt, ketoxime ether, aminoacetophenone compounds, hydroxyacetophenone, and the like, and oxime compounds are particularly preferable.

For the oxime compounds, it is possible to refer to the description of the compounds which are represented by Formula (OX-1) or (OX-2) from paragraph "0513" onward in JP2012-208494A (corresponding to paragraph "0632" in US2012/235099A) and the contents thereof are included in the present specification.

In addition, it is possible to use commercially available products such as TRONLY TR-PBG-304, TRONLY TR-PBG-309, and TRONLY TR-PBG-305 (produced by Changzhou Tronly New Electronic Materials Co., Ltd). In addition, it is also possible to use commercially available products such as Adeka ARKLS Nci-831 and Adeka ARKLS NCI-930 (produced by Adeka Corporation).

The content of the photopolymerization initiator in the composition of the present invention is preferably 0.01 mass % to 5 mass % with respect to the total solid content of the composition of the present invention and more preferably 0.1 mass % to 1 mass %.

<<Binder>>

The binder is not particularly limited; however, a binder which includes a compound which is represented by General Formula (1) below as a copolymer component is preferably contained (appropriately referred to below as a "specific binder"). The binder may be only one type or two or more types may be used together.

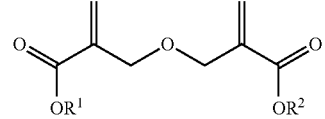

(1)

In General Formula (1), $R^1$ and $R^2$ each independently represent a hydrogen atom or an alkyl group.

The alkyl group of $R^1$ and $R^2$ in General Formula (1) may have a substituent group.

The alkyl group in General Formula (1) is preferably an alkyl group with 1 to 25 carbon atoms and not particularly limited; however, examples thereof include a straight-chain or branched alkyl group such as methyl, ethyl, n-propyl, isopropyl, n-butyl, isobutyl, t-butyl, t-amyl, stearyl, lauryl, and 2-ethylhexyl; an aryl group such as phenyl; an alicyclic group such as cyclohexyl, t-butylcyclohexyl, dicyclopentadienyl, tricyclodecanyl, isobornyl, adamantyl, and 2-methyl-2-adamantyl; an alkyl group which is substituted with alkoxy such as 1-methoxyethyl and 1-ethoxyethyl; an alkyl group which is substituted with an aryl group such as benzyl; and the like. Among these, a primary or secondary hydrocarbon group which is not easily desorbed due to an acid or heat such as methyl, ethyl, cyclohexyl, and benzyl is particularly preferable in terms of the heat resistance. Here, $R^1$ and $R^2$ may be the same type of substituent group or may be different substituent groups.

Examples of the compound which is represented by General Formula (1) include dimethyl-2,2'-[oxybis(methylene)]bis-2-propenoate, diethyl-2,2'-[oxybis(methylene)]bis-2-propenoate, di(n-propyl)-2,2'-[oxybis(methylene)]bis-2-propenoate, di(n-butyl)-2,2'-[oxybis(methylene)]bis-2-propenoate, di(t-butyl)-2,2'-[oxybis(methylene)]bis-2-propenoate, di(isobutyl)-2,2'-[oxybis(methylene)]bis-2-propenoate, di(cyclohexyl)-2,2'-[oxybis(methylene)]bis-2-propenoate, di(benzyl)-2,2'-[oxybis(methylene)]bis-2-propenoate, and the like.

Among these, dimethyl-2,2'-[oxybis(methylene)]bis-2-propenoate is particularly preferable.

In addition, an alkali-soluble resin may be used as the binder. For the alkali-soluble resin, it is possible to refer to the description in paragraphs "0558" to "0571" and onward in JP2012-208494A (corresponding to paragraphs "0685" to "0700" in US2012/0235099A) and the contents thereof are included in the present specification.

Furthermore, it is preferable to use the copolymer (B) described in paragraphs "0029" to "0063" and the alkali-soluble resins used in the Examples in JP2012-32767A, the binder resins described in paragraphs "0088" to "0098" and the binder resins used in the Examples in JP2012-208474A, the binder resins described in paragraphs "0022" to "0032" and the binder resins used in the Examples in JP2012-137531A, the binder resins described in paragraphs "0132" to "0143" and the binder resins used in the Examples in JP2013-024934A, the binder resins described in paragraphs "0092" to "0098" and the binder resins used in the Examples in JP2011-242752A, and the binder resins described in paragraphs "0030" to "0072" in JP2012-032770A. The contents thereof are included in the present specification. In more detail, the resins below are preferable.

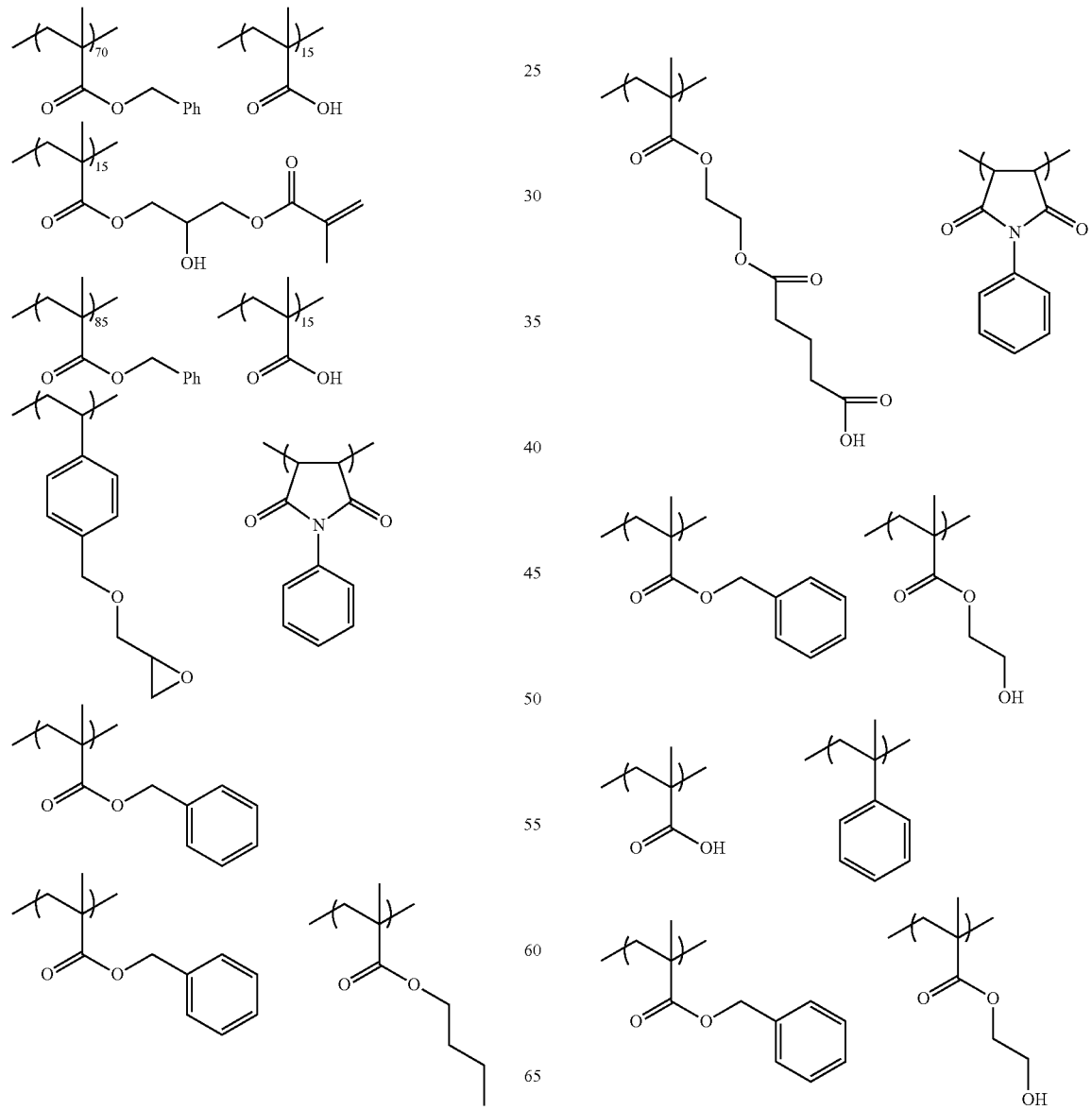

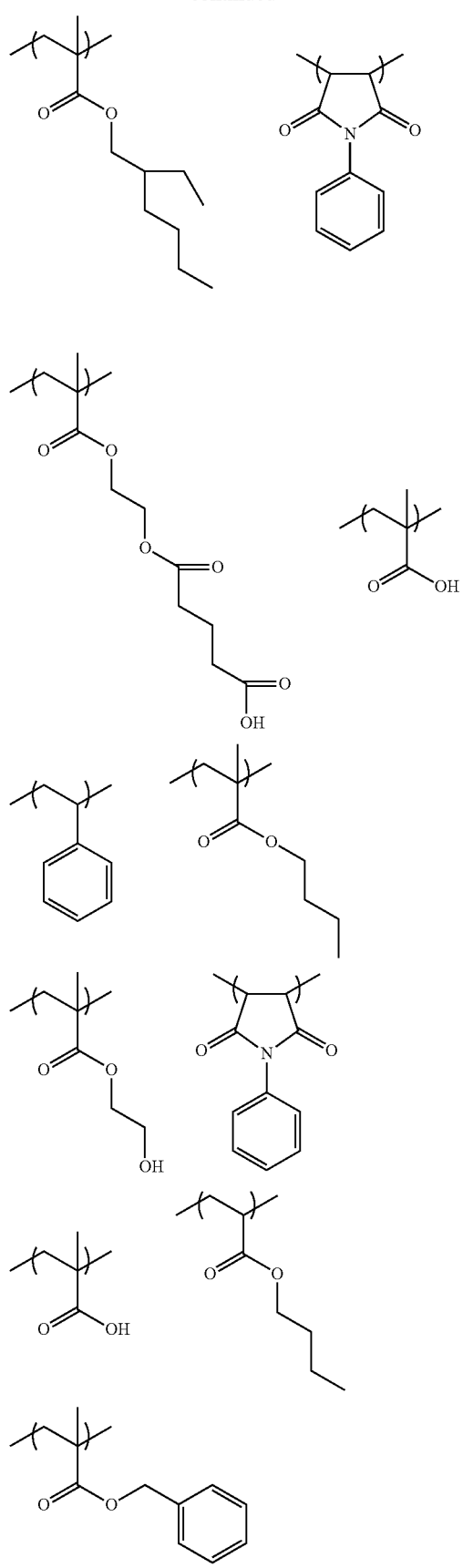
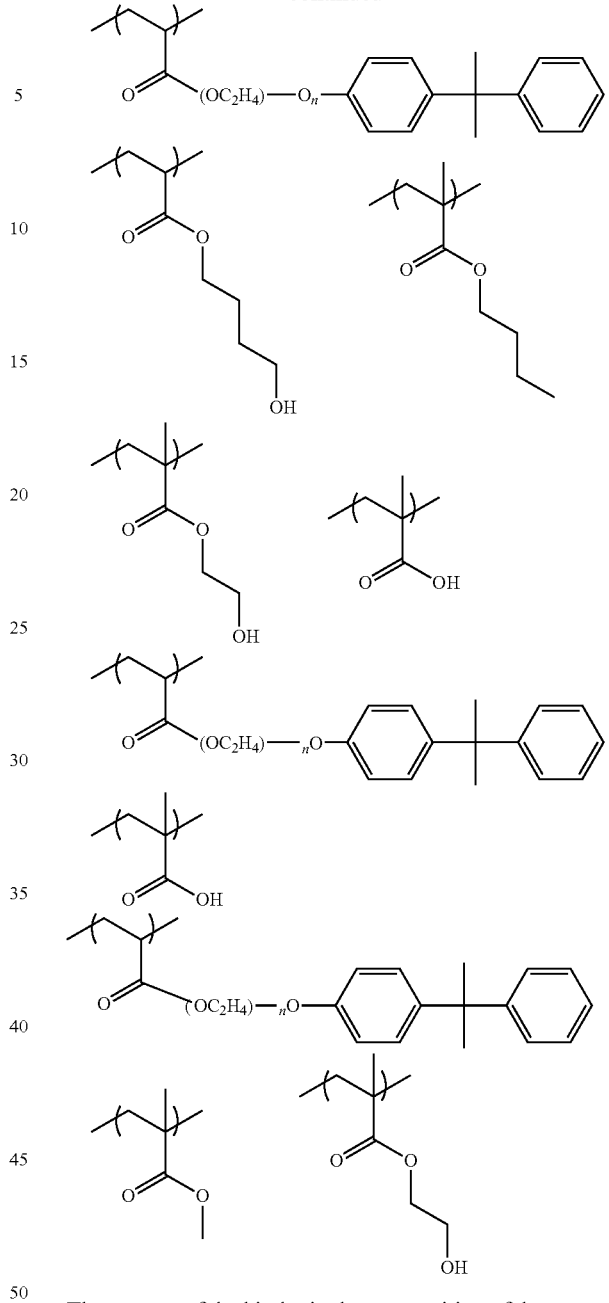

The content of the binder in the composition of the present invention is preferably 0.01 mass % to 10 mass %, and more preferably 1 mass % to 5 mass %, of the total solid content of the composition of the present invention.

<<Surfactant>>

Only one type of the surfactant may be used or two or more types may be used together. As the surfactant, it is possible to use various types of surfactants such as fluorine-based surfactants, non-ionic surfactants, cationic surfactants, anionic surfactants, and silicone-based surfactants. In particular, since the liquid characteristics (particularly fluidity) when preparing the composition of the present invention as a coating liquid are further improved by a fluorine-based surfactant being contained, it is possible to further improve the uniformity of the coating thickness or the liquid saving property. For the surfactant, it is possible to refer to, for example, the description in the paragraphs "0552" to "0556" in JP2012-208494A (corresponding to the paragraphs "0678" to "0682" in US2012/0235099A) and the contents thereof are included in the present specification.

The content of the surfactant in the composition of the present invention is preferably 0.001 mass % to 2 mass %, and more preferably 0.005 mass % to 1 mass %, of the total solid content of the composition of the present invention.

<<Polymerization Inhibitor>>

Only one type of the polymerization inhibitor may be used or two or more types may be used together. Examples of the polymerization inhibitor include hydroquinone, p-methoxyphenol, di-t-butyl-p-cresol, pyrogallol, t-butylcatechol, benzoquinone, 4,4'-thiobis(3-methyl-64-butylphenol), 2,2'-methylenebis(4-methyl-6-t-butylphenol), N-nitrosophenyl hydroxyamine primary cerium salt, and the like.

The content of the polymerization inhibitor in the composition of the present invention is preferably 0.001 mass % to 1 mass %, and more preferably 0.005 mass % to 0.1 mass %, of the total solid content of the composition of the present invention.

<Color Filter>

In a case where the composition of the present invention is a colored photosensitive composition for color filters which further includes a photopolymerizable compound, a photopolymerization initiator, and the like in addition to the pigment (A) and the polymer (B), it is possible to use the composition of the present invention in color filters. For the method for producing color filters, for example, it is possible to refer to the description in the paragraphs "0193" to "0208" in JP2011-137125A and the contents thereof are included in the present specification.

In addition, an oxygen-impermeable film may be formed on the color filter. The oxygen-impermeable film is preferably provided on the surface of a color filter layer formed of the colored composition of the present invention. Examples of the oxygen-impermeable film which is used in the present invention include an oxygen-impermeable film of which the oxygen transmission rate is 50 ml/m²·day·atm or less.

The oxygen-impermeable film is preferably 50 ml/m²·day·atm or less. The lower limit is not particularly limited; however, 0 ml/m²·day·atm is preferable.

It is possible to measure the oxygen transmission rate of the oxygen-impermeable film, for example, as follows. A Model 3600 manufactured by Orbisphere Laboratories Japan Ink Co., Ltd. is used as an oxygen electrode. Polyfluoroalkoxy (PFA) 2956A which has the fastest response speed and the highest sensitivity is used as an electrode diaphragm. Silicone grease (SH111, produced by Dow Corning Toray Co., Ltd.) is thinly coated on the electrode diaphragm, a thin film material to be measured is pasted thereon, and the oxygen concentration value is measured. Here, it is confirmed that a coating film of silicone grease does not affect the oxygen transmission speed. Next, the oxygen transmission speed (ml/m²·day·atm) with respect to the oxygen concentration value is converted.

For the oxygen-impermeable film, it is possible to refer to, for example, the description in the paragraphs "0217" to "0221" in JP2011-248197A and the contents thereof are included in the present specification.

EXAMPLES

More detailed description will be given below of the present invention using Examples. It is possible to appropriately change the material, usage amount, ratio, processing contents, processing order, and the like which are shown in Examples below within a scope which does not depart from the gist of the present invention. Accordingly, the ranges of the present invention are not limited to the specific examples which will be shown below. Here, unless otherwise stated, "%" and "part" are based on mass.

Synthesis Example 1

Synthesis of Macromonomer (N-1)

Under a nitrogen atmosphere, 35.0 g (0.27 mol) of 2-ethylhexanol, 307.1 g (2.70 mol) of ε-caprolactone, and 0.20 g of monobutyl tin oxide were heated at 90° C. for 5 hours and subsequently at 110° C. for 10 hours and a polyester monohydroxy body was obtained. The completion of the reaction was confirmed by measuring the loss of ε-caprolactone using NMR. After cooling the polyester monohydroxy body to 80° C., 0.071 g of 2,6-ditertiary-butyl-4-methylphenol and 42.3 g (0.27 mol) of 2-methacryloyloxyethylisocyanate were added thereto, reaction was carried out at 80° C. for 3 hours, and a macromonomer (N-1) was obtained. The completion of the reaction was confirmed by measuring the loss of 2-methacryloyloxyethylisocyanate using NMR. The weight average molecular weight of the macromonomer (N-1) according to GPC measurement was 3,000.

<Synthesis of Polymer (B-1)>

The polymer (B-1) was synthesized as follows.

35 g of 2-diisopropylaminoethyl methacrylate (L-1), 10 g of methacrylic acid (M-4), 55 g of the macromonomer (N-1) (the weight average molecular weight (polystyrene converted value) according to the GPC method is 3,000), and 6 g of dodecanethiol were added to 233 g of propylene glycol monomethyl ether (MFG) and stirred at 75° C. for one hour under a nitrogen atmosphere. 0.5 g of dimethyl 2,2'-bisisobutyrate (V-601, produced by Wako Pure Chemical Industries, Ltd.) was added thereto and heated at 75° C. for 2 hours. 0.5 g of 2,2'-azobis(methyl isobutyrate) was further added thereto and heated at 75° C. for 2 hours. After this, the solution was heated at 90° C. for 2 hours and then left to cool and a solution of 30 mass % of the polymer (B-1) was obtained.

The scheme will be shown below.

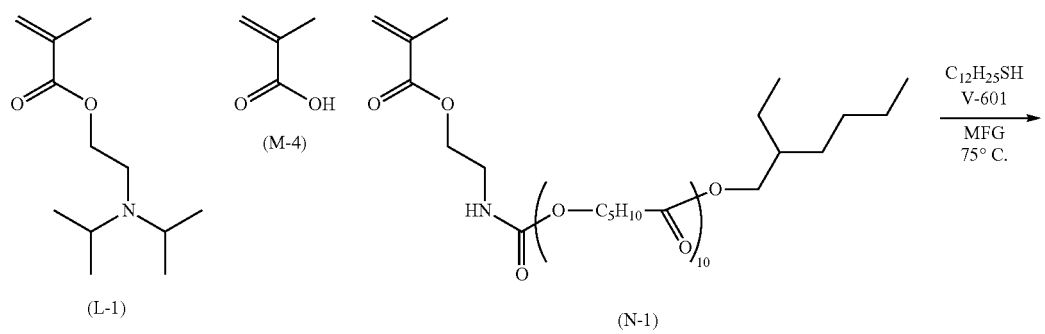

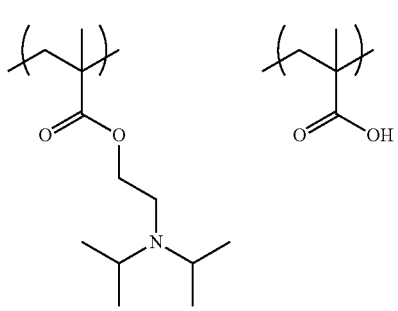
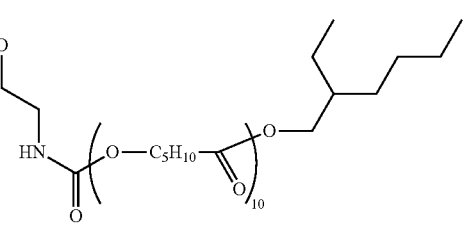

Synthesis Examples 2 to 22 and 27 to 30, and Comparative Synthesis Examples 1 to 9

<Synthesis of Polymers (B-2) to (B-22) and (B-27) to (B-30)>

The polymers (B-2) to (B-22) and (B-27) to (B-30), and the Comparative Polymers (Comparative Polymer 1) to (Comparative Polymer 9) were obtained by performing the same operation as for Synthesis Example 1 apart from changing the monomers (L-1), (M-4), and (N-1) which were used in Synthesis Example 1 to the macromonomers and monomers shown in Table 2 below.

Synthesis Example 23

<Synthesis of Polymer (B-23)>

19.6 g of methacrylic acid (M-4), 55 g of the macromonomer (N-1) (the weight average molecular weight (polystyrene converted value) according to the GPC method is 3,000), and 4.5 g of dodecanethiol were added to 233 g of propylene glycol monomethyl ether (MFG) and stirred at 75° C. for one hour under a nitrogen atmosphere. 0.5 g of dimethyl 2,2'-bisiso butyrate (V-601, produced by Wako Pure Chemical Industries, Ltd.) was added thereto and heated at 75° C. for 2 hours. 0.5 g of 2,2'-azobis(methyl isobutyrate) was further added thereto and heated at 75° C. for 2 hours. After this, the solution was heated at 90° C. for 2 hours. Subsequently, 0.5 g of tetrabutylammonium bromide was added to the solution which was heated to 90° C. 25.4 g of 1,2,2,6,6-pentamethyl-4-(2,3 epoxypropoxy) piperidine was added dropwise to the solution over 30 minutes, reacted at 90° C. for 6 hours, then left to cool, and a solution of 30 mass % of the polymer (B-23) was obtained. The amine value (solid content conversion) of the obtained polymer (B-23) was 1.3 mmol/g, the acid value (solid content conversion) was 62 mgKOH/g, and the weight average molecular weight according to the GPC method (the polystyrene converted value) was 15,000. Here, 1,2,2,6,6-pentamethyl-4-(2,3 epoxypropoxy) piperidine was synthesized according to the method described in paragraph "0130" in JP1995-70248A (JP-H07-70248A).

Polymer B-23

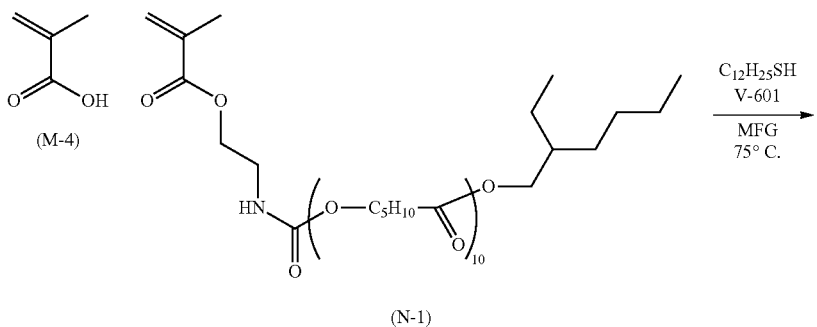

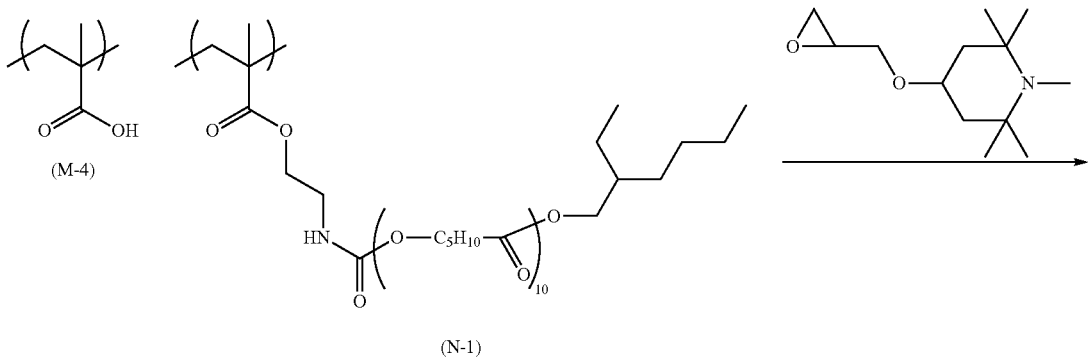

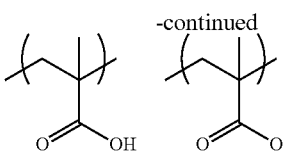
-continued
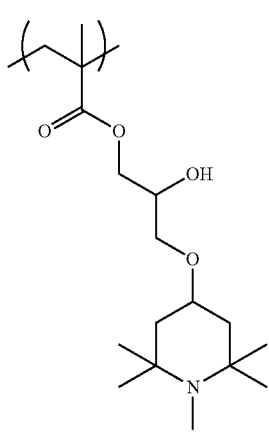
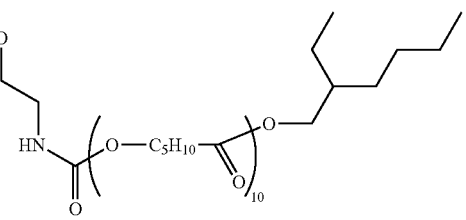

Synthesis Example 24

<Synthesis of Polymer (B-24)>

19.6 g of methacrylic acid (M-4), 55 g of the macromonomer (N-1) (the weight average molecular weight (polystyrene converted value) according to the GPC method is 3,000), and 4.5 g of dodecanethiol were added to 233 g of propylene glycol monomethyl ether (MFG) and stirred at 75° C. for one hour under a nitrogen atmosphere. 0.5 g of dimethyl 2,2'-bisiso butyrate (V-601, produced by Wako Pure Chemical Industries, Ltd.) was added thereto and heated at 75° C. for 2 hours. 0.5 g of 2,2'-azobis(methyl isobutyrate) was further added thereto and heated at 75° C. for 2 hours. After this, the solution was heated at 90° C. for 2 hours.

Subsequently, 0.5 g of tetrabutylammonium bromide was added to the solution which was heated to 90° C. 15.4 g of 1,2,2,6,6-pentamethyl-4-(2,3 epoxypropoxy) piperidine was added dropwise to the solution over 20 minutes and 10.0 g of glycidylmethacrylate was subsequently added dropwise thereto over 10 minutes. The solution was reacted at 90° C. for 6 hours, then left to cool, and a solution of 30 mass % of the polymer (B-24) was obtained. The amine value (solid content conversion) of the obtained polymer (B-24) was 0.8 mmol/g, the acid value (solid content conversion) was 56 mgKOH/g, and the weight average molecular weight according to the GPC method (the polystyrene converted value) was 15,000.

Polymer (B-24)

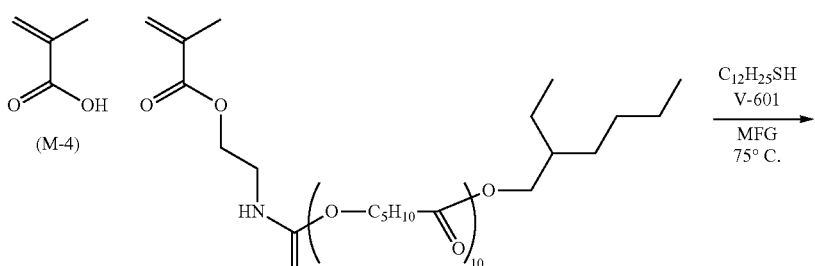

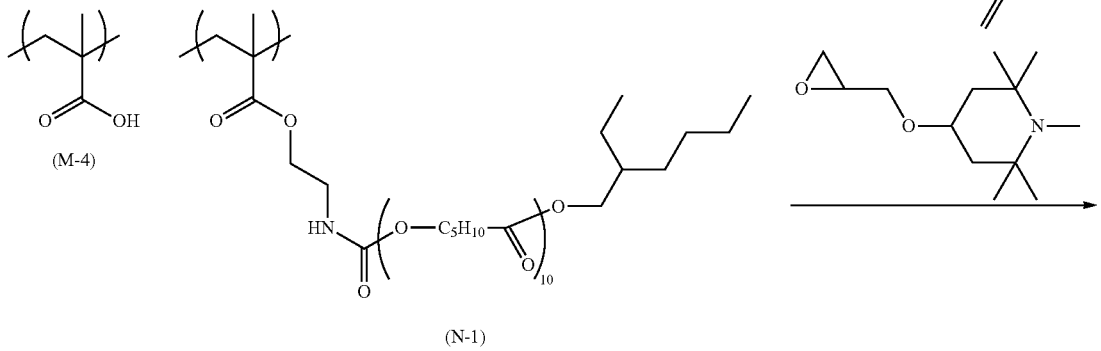

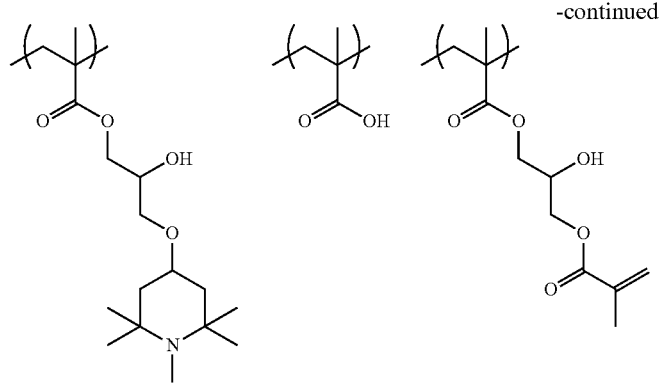
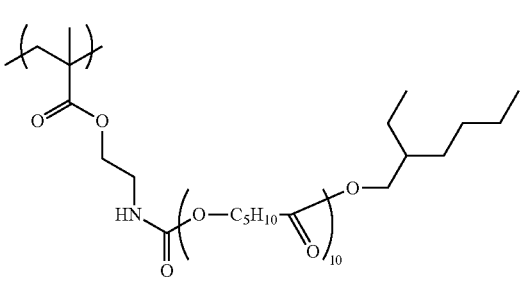

Synthesis Example 25

<Synthesis of Polymer (B-25)>

30.0 g of methyl methacrylate and 3.2 g of α-thioglycerol were added to 77.5 g of N-methylpyrrolidinone (NMP) and stirred at 75° C. for one hour under a nitrogen atmosphere.

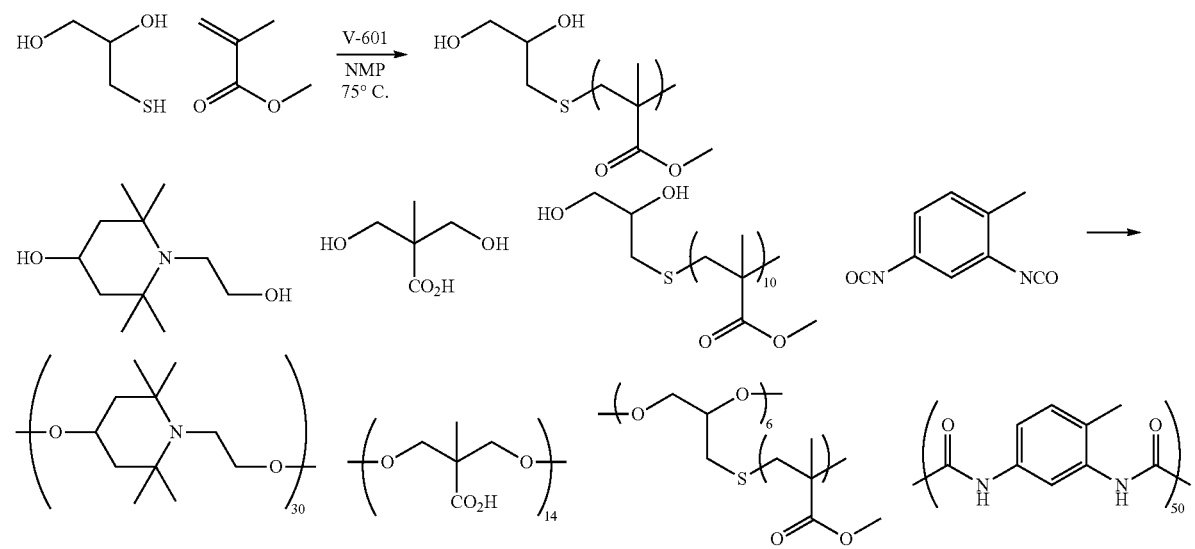

0.1 g of dimethyl 2,2'-bisiso butyrate (V-601, produced by Wako Pure Chemical Industries, Ltd.) was added thereto and heated at 75° C. for 2 hours. 0.1 g of 2,2'-azobis(methyl isobutyrate) was further added thereto and heated at 75° C. for 2 hours. After this, the solution was heated at 90° C. for 2 hours.

After cooling the solution to room temperature once, 30.2 g of 4-hydroxy-1-(2-hydroxyethyl)-2,2,6,6-tetramethylpiperidine, 9.4 g of 2,2-bis(hydroxymethyl)propionic acid, 43.5 g of toluenediisocianate, 0.4 g of NEOSTANN U-600 (produced by Nitto Kasei Co., Ltd.), and 194.1 g of NMP were added to the cooled solution. After reacting the solution at 70° C. for 3 hours, 8.2 g of methanol was added dropwise thereto. Subsequently, after cooling the solution to room temperature, the cooled solution was added dropwise to 1500 g of water being stirred over 30 minutes and the extracted solid content was taken out by filtering and dried. The polymer (B-25) was obtained in this manner. The amine value (solid content conversion) of the obtained polymer (B-25) was 1.2 mmol/g, the acid value (solid content conversion) was 33 mgKOH/g, and the weight average molecular weight (the polystyrene converted value) according to the GPC method was 2,5000.

The composition ratio of the polymer (B-25) is represented as the mol %.

Synthesis Example 26

<Synthesis of Macromonomer (N-7)>

Under a nitrogen atmosphere, 35.0 g (0.27 mol) of 2-ethylhexanol, 307.1 g (2.70 mol) of ε-caprolactone, and 0.20 g of monobutyl tin oxide were heated at 90° C. for 5 hours and subsequently at 110° C. for 10 hours and a polyester monohydroxy body was obtained. The completion of the reaction was confirmed by measuring the loss of ε-caprolactone using NMR. Subsequently, 0.071 g of 2,6-ditertiary-butyl-4-methylphenol and 37.7 g (0.27 mol) of allyl succinic acid anhydride were added to the polyester monohydroxy body, a reaction was carried out at 110° C. for 8 hours, and a macromonomer N-7 was obtained. The completion of the reaction was confirmed by measuring 95% or more loss of the allyl succinic acid anhydride using NMR. The weight average molecular weight of the macromonomer N-7 according to GPC measurement was 2,000. In addition, the acid value of the macromonomer N-7 was 40 mgKOH/g.

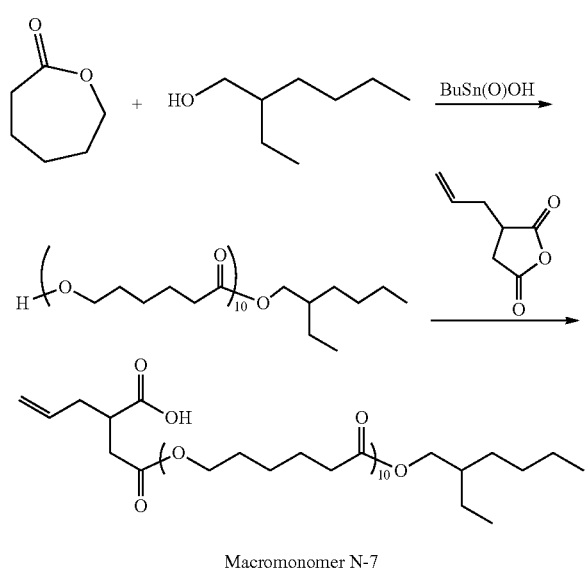

Macromonomer N-7

<Synthesis of Polymer (B-26)>

8.0 g (10.2 mmol) of dipentaerythritol hexakis (3-mercapto propionate) (produced by Sakai Chemical Industry Co., Ltd.), 43.2 g (30.6 mmol) of the macromonomer N-7, and 76.3 g of propylene glycol monomethyl ether were placed in a reaction container and heated to 90° C. while introducing nitrogen gas into the reaction container. Subsequently, after stirring at the same temperature for 15 minutes, 0.14 g (0.62 mmol) of V-601 was added to the solution to start a reaction. Subsequently, after carrying out the reaction at the same temperature for 2 hours, 0.14 g (0.62 mmol) of V-601 was added to the solution and further stirred at 90° C. for 2 hours. Subsequently, after 7.3 g of 1,2,2,6,6-pentamethyl-4-piperidyl methacrylate and 17.1 g of propylene glycol monomethyl ether were added to the solution and stirred at the same temperature for 15 minutes, 0.14 g (0.62 mmol) of V-601 was added thereto to start a reaction. Subsequently, after carrying out the reaction at the same temperature for 2 hours, the polymer (B-26) (solid content concentration=30.5 weight %) was obtained by adding 0.14 g (0.62 mmol) of V-601 to the solution and further carrying out the reaction at 90° C. for 2 hours. The completion of the reaction was confirmed by measuring 95% or more loss of the double bond moiety of the macromonomer N-7 and 1,2,2,6,6-pentamethyl-4-piperidyl methacrylate using NMR. The weight average molecular weight of the polymer (B-26) according to GPC measurement was 7,000. In addition, by titration using a 0.1 N sodium hydroxide aqueous solution, the acid value of the polymer (B-26) was 30 mgKOH/g and the amine value (solid content conversion) was 0.5 mmol/g.

Polymer (B-26)

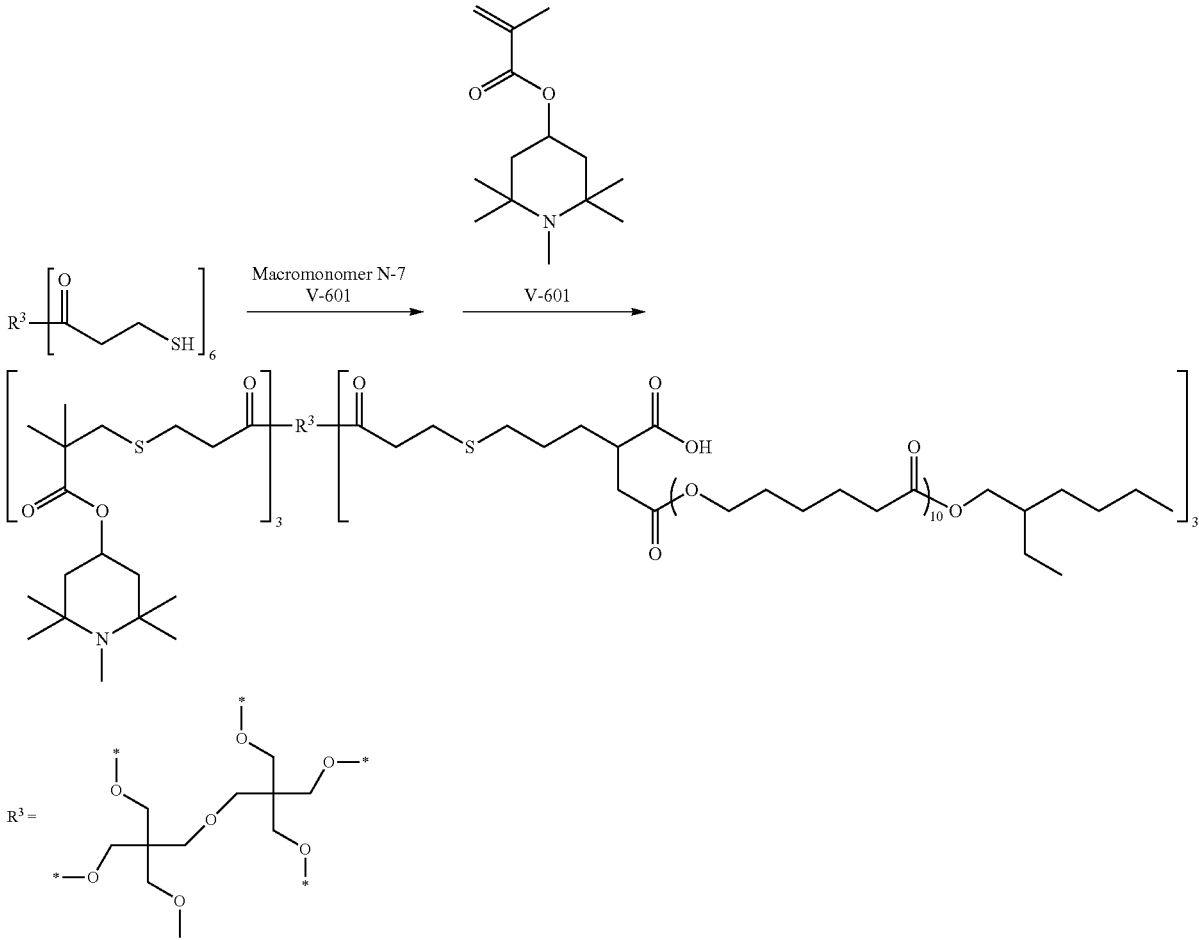

Comparative Synthesis Examples 8 and 9

Comparative Polymers 8 and 9 are as shown by the structural formulas below and were synthesized in the same manner as Example 5 in JP2003-012744A and Example 1 in JP5141448B respectively.

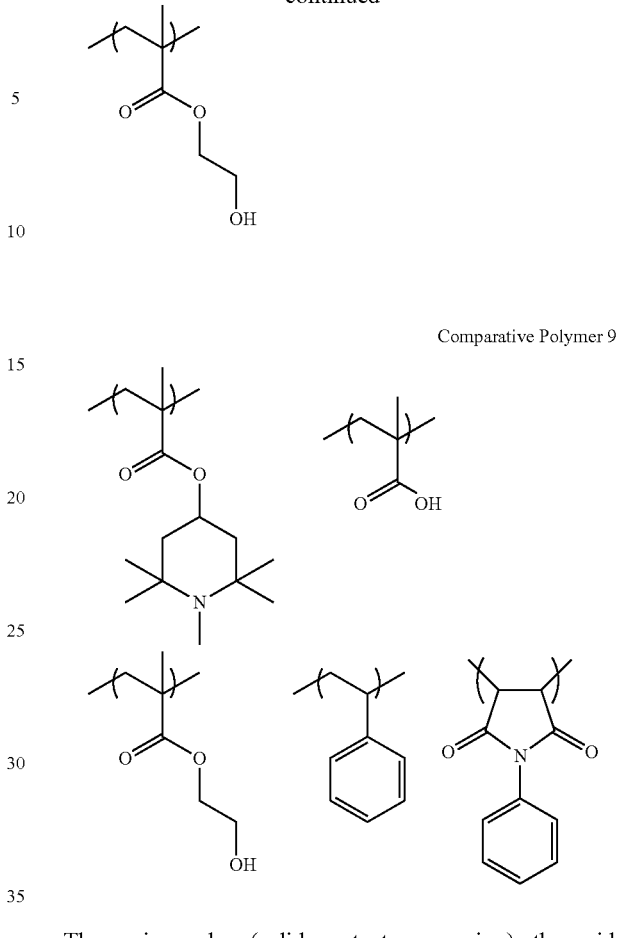

Comparative Polymer 8

Comparative Polymer 9

The amine value (solid content conversion), the acid value (solid content conversion), and the weight average molecular weight according to the GPC method (the polystyrene converted value) of the polymers (B-1) to (B-30) and the Comparative Polymers 1 to 9 are shown in Table 2 below.

TABLE 2

| | Polymer (B) | Monomer (L) | | Monomer (M) | | Macro-monomer (N) | | Other components | Molar ratio (L/M/N/other) | Amine value mmol/g | Acid value mgKOH/g | Weight average molecular weight Mw |
|---|---|---|---|---|---|---|---|---|---|---|---|---|
| Synthesis Example 1 | B-1 | L-1 | 35 g | M-4 | 10 g | N-1 | 55 g | | 52/36/12 | 1.6 | 64 | 12000 |
| Synthesis Example 2 | B-2 | L-2 | 35 g | M-4 | 10 g | N-1 | 55 g | | 51/37/12 | 1.5 | 65 | 13000 |
| Synthesis Example 3 | B-3 | L-3 | 35 g | M-4 | 10 g | N-1 | 55 g | | 49/39/12 | 1.4 | 63 | 11000 |
| Synthesis Example 4 | B-4 | L-5 | 35 g | M-4 | 10 g | N-1 | 55 g | | 44/42/14 | 1.5 | 66 | 12000 |
| Synthesis Example 5 | B-5 | L-6 | 35 g | M-13 | 10 g | N-1 | 55 g | | 45/43/12 | 1.4 | 78 | 10000 |
| Synthesis Example 6 | B-6 | L-9 | 35 g | M-13 | 10 g | N-1 | 55 g | | 47/41/12 | 1.5 | 78 | 9000 |
| Synthesis Example 7 | B-7 | L-3 L-6 | 25 g 10 g | M-4 | 10 g | N-1 | 55 g | | 32/13/43/12 | 1.4 | 62 | 13000 |
| Synthesis Example 8 | B-8 | L-1 | 35 g | M-2 | 10 g | N-1 | 55 g | | 65/19/16 | 1.6 | 27 | 16000 |
| Synthesis Example 9 | B-9 | L-3 | 35 g | M-3 | 10 g | N-1 | 55 g | | 63/20/17 | 1.4 | 26 | 15000 |
| Synthesis Example 10 | B-10 | L-1 | 35 g | M-4 M-10 | 5 g 5 g | N-1 | 55 g | | 58/20/8/14 | 1.6 | 45 | 15000 |
| Synthesis Example 11 | B-11 | L-3 | 35 g | M-4 M-11 | 5 g 5 g | N-1 | 55 g | | 51/20/15/14 | 1.4 | 55 | 14000 |

TABLE 2-continued

| | Polymer (B) | Monomer (L) | | Monomer (M) | | Macro-monomer (N) | | Other components | | Molar ratio (L/M/N/other) | Amine value mmol/g | Acid value mgKOH/g | Weight average molecular weight Mw |
|---|---|---|---|---|---|---|---|---|---|---|---|---|---|
| Synthesis Example 12 | B-12 | L-1 | 35 g | M-4 | 10 g | N-2 | 55 g | | | 55/39/6 | 1.6 | 65 | 12000 |
| Synthesis Example 13 | B-13 | L-3 | 35 g | M-4 | 10 g | N-3 | 55 g | | | 48/38/14 | 1.4 | 62 | 21000 |
| Synthesis Example 14 | B-14 | L-1 | 35 g | M-4 | 10 g | N-4 | 55 g | | | 49/35/16 | 1.6 | 65 | 15000 |
| Synthesis Example 15 | B-15 | L-3 | 35 g | M-4 | 10 g | N-5 | 55 g | | | 53/42/5 | 1.4 | 65 | 21000 |
| Synthesis Example 16 | B-16 | L-3 | 35 g | M-4 | 10 g | N-6 | 55 g | | | 54/43/3 | 1.4 | 62 | 33000 |
| Synthesis Example 17 | B-17 | L-3 | 30 g | M-4 | 10 g | N-1 | 50 g | 2-ethyl-hexyl meth-acrylate | 10 g | 38/36/11/15 | 1.2 | 65 | 13000 |
| Synthesis Example 18 | B-18 | L-3 | 30 g | M-4 | 25 g | N-1 | 45 g | | | 28/65/7 | 1.2 | 160 | 11000 |
| Synthesis Example 19 | B-19 | L-3 | 10 g | M-4 | 10 g | N-1 | 80 g | | | 20/54/26 | 0.4 | 63 | 18000 |
| Synthesis Example 20 | B-20 | L-1 | 50 g | M-4 | 10 g | N-1 | 40 g | | | 62/31/7 | 2.3 | 62 | 10000 |
| Synthesis Example 21 | B-21 | L-3 | 30 g | M-7 | 20 g | N-1 | 50 g | | | 54/31/15 | 1.2 | 40 | 15000 |
| Synthesis Example 22 | B-22 | L-3 | 30 g | M-11 | 20 g | N-1 | 50 g | | | 55/29/16 | 1.2 | 38 | 16000 |
| Synthesis Example 27 | B-27 | L-3 | 7 g | M-4 | 10 g | N-1 | 83 g | | | 13/61/26 | 0.1 | 80 | 20000 |
| Synthesis Example 28 | B-28 | L-3 | 70 g | M-4 | 5 g | N-1 | 25 g | | | 77/18/5 | 2.9 | 40 | 14000 |
| Synthesis Example 29 | B-29 | L-3 | 30 g | M-7 | 6 g | N-1 | 64 g | | | 65/11/24 | 1.2 | 12 | 14000 |
| Synthesis Example 30 | B-30 | L-3 | 20 g | M-4 | 40 g | N-1 | 40 g | | | 14/81/5 | 0.8 | 260 | 10000 |
| Comparative Synthesis Example 1 | Comparative Polymer 1 | L-3 | 35 g | | | N-1 | 65 g | | | 78/22 | 1.4 | 0 | 14000 |
| Comparative Synthesis Example 2 | Comparative Polymer 2 | L-1 | 35 g | | | N-2 | 65 g | | | 88/12 | 1.6 | 0 | 15000 |
| Comparative Synthesis Example 3 | Comparative Polymer 3 | L-3 | 35 g | | | N-3 | 65 g | | | 76/24 | 1.4 | 0 | 13000 |
| Comparative Synthesis Example 4 | Comparative Polymer 4 | L-1 | 35 g | | | N-4 | 65 g | | | 72/28 | 1.6 | 0 | 16000 |
| Comparative Synthesis Example 5 | Comparative Polymer 5 | L-10 | 35 g | M-4 | 10 g | N-1 | 55 g | | | 55/34/11 | 1.8 | 63 | 10000 |
| Comparative Synthesis Example 6 | Comparative Polymer 6 | L-11 | 35 g | M-4 | 10 g | N-1 | 55 g | | | 55/34/11 | 1.8 | 62 | 13000 |
| Comparative Synthesis Example 7 | Comparative Polymer 7 | Dimethyl amino-methyl meth-acrylate | 30 g | M-4 | 10 g | N-1 | 60 g | | | 55/33/12 | 1.9 | 62 | 14000 |
| Comparative Synthesis Example 8 | Comparative Polymer 8 | | | | | | | | | | 0.12 | 0 | 35000 |
| Comparative Synthesis Example 9 | Comparative Polymer 9 | | | | | | | | | | 0.21 | 130 | 12000 |

In Table 2 above, L-2 to L-11 represent monomers having the structures below.

(L-2) 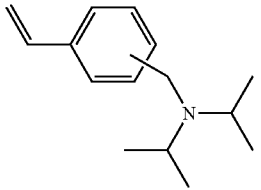

(L-3) 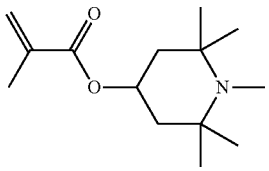

(L-4) 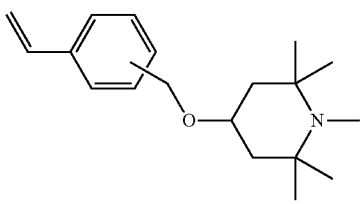

(L-5) 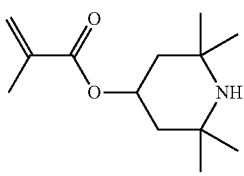

(L-6) 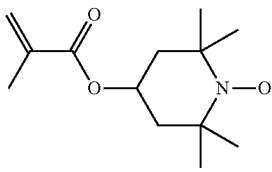

(L-7) 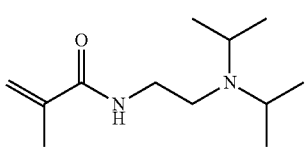

(L-8) 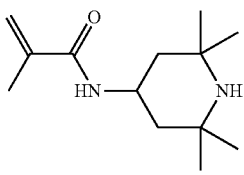

(L-9) 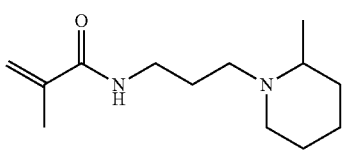

(L-10) 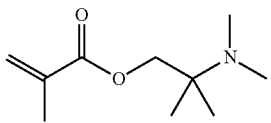

(L-11) 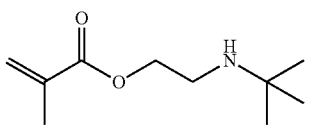

In Table 2 above, M-2, M-3, M-10, M-11, and M-13 represent monomers having the structures below.

(M-2) 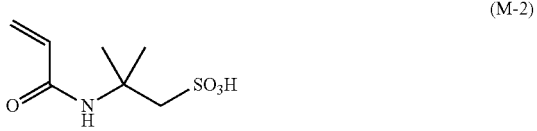

(M-3) 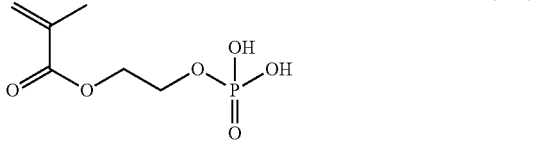

(M-10) 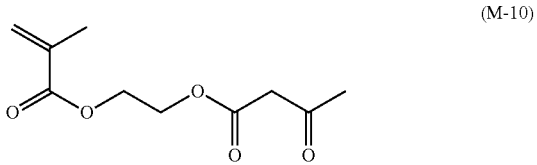

(M-11) 

(M-13) 

The macromonomer (N-2) shown in Table 2 above is "AA-6" produced by Toagosei Co., Ltd. (the weight average molecular weight according to the GPC method (the polystyrene converted value) is 6,500), (N-3) is "PLACCEL FA10L" produced by Daicel Corporation. (the weight average molecular weight according to the GPC method (the polystyrene converted value) is 3,000), (N-4) is Blemmer PME1000 produced by NOF Corporation. (the weight average molecular weight according to the GPC method (the polystyrene converted value) is 2,000), and (N-5) and (N-6) are the macromonomers shown below ((N-5): the weight average molecular weight (the polystyrene converted value) is 13,000, (N-6): the weight average molecular weight (a polystyrene converted value) is 21,000).

(N-5)

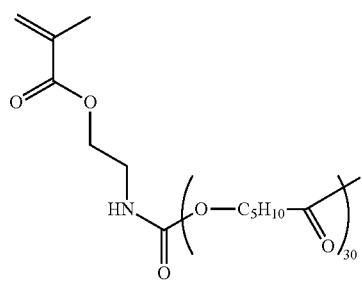

(N-6)

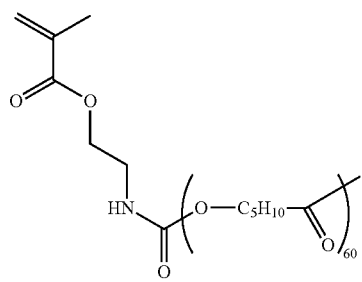

Example 1

<<Preparation of Pigment Dispersing Liquid>>

After evenly stirring and mixing a mixture formed of 8.9 parts of a compound which is represented by Formula (A5) below as a pigment, 2.7 parts of PY139, 1.4 parts of a compound which is represented by Formula (D1) below as a pigment derivative, 17.3 parts of a 30 mass % MFG solution of the polymer B-1 as a dispersant, and 69.7 parts of PGMEA as a solvent, a pigment dispersing liquid was prepared by carrying out dispersion for 5 hours using a bead mill (a high pressure dispersion apparatus with a decompression mechanism NANO-3000-10 (manufactured by Beryu Corporation)) using zirconia beads with a diameter of 0.5 mm.

Formula (A5)

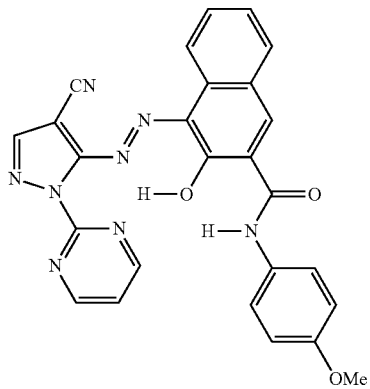

Formula (D1)

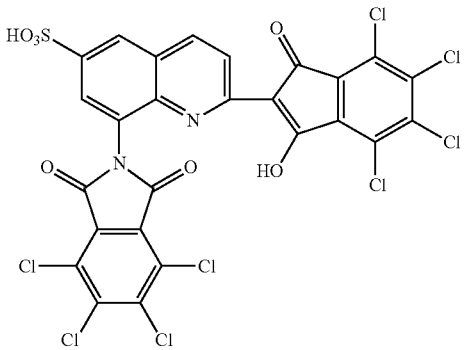

<Preparation of Colored Photosensitive Composition>

After taking 65.8 parts of the pigment dispersing liquid, 2.4 parts of the binder (B-1), 1.1 parts of A-DPH-12E (produced by Shin-Nakamura Chemical Co., Ltd.), 0.5 parts of IRGACURE OXE 01 (1.2-octanedione,1-[4-(phenylthio) phenyl]-,2-(O-benzoyloxime), produced by BASF Japan Ltd.), 0.01 parts of p-methoxyphenol, 4.2 parts of a 1.0% PGMEA solution of Megaface F781 (produced by DIC Corporation), and 26.0 parts of PGMEA and mixing and stirring these, a colored photosensitive composition was prepared by carrying out filtering using a filter made of nylon with a hole diameter of 0.45 μm (manufactured by Nihon Pall Ltd.).

As the binder (B-1), a binder which was produced by the method described in paragraphs "0304" to "0307" in JP2012-173356A was used.

The obtained composition was evaluated as follows.

<Production of Substrate for Light Resistance Evaluation>

A coating film was formed by coating the colored photosensitive composition which was prepared above on a glass substrate using a spincoater (manufactured by Mikasa Co., Ltd.). Then, a heating process (prebaking) was performed for 120 seconds using a hotplate at 100° C. such that the dry film thickness of the coating film was 0.6 μm. Subsequently, heating was performed at 200° C. for 5 minutes, the coating film was cured, and a colored layer was formed.

<Formation of Oxygen-Impermeable Film>

SiO$_2$ sputtering was carried out on a glass substrate on which the colored layer was formed using a sputtering apparatus (SRV-4300 manufactured by Shinko Seiki Co., Ltd.) and an oxygen-impermeable film was formed on the colored layer such that the oxygen transmission rate was 50 ml/m$^2$·day·atm.

<Light Resistance Test>

A light resistance test was carried out on the glass substrate on which the oxygen-impermeable film was formed for 1,000 hours using a light resistance test apparatus (SX-75 manufactured by Suga Test Instruments Co., Ltd.) under conditions of a black panel temperature of 63° C., a quartz inner filter, a 275 nm cut outer filter, 75 mw/m$^2$ (300 nm to 400 nm) illumination, and 50% humidity.

<Light Resistance Evaluation>

The color difference (ΔE*ab) before and after the light resistance test was measured using a spectrophotometer MCPD-3000 (manufactured by Otsuka Electronics Co., Ltd.). Based on the measured color difference (ΔE*ab), the light resistance was evaluated according to the evaluation criteria below. The smaller the numerical value, the more favorable the light resistance. The evaluation results are shown in the table below. A and B are levels at which there is no problem in actual usage.

<Evaluation Criteria>
A: ΔE*ab is 3 or less
B: ΔE*ab is more than 3 to 5
C: ΔE*ab is more than 5 to 10
D: ΔE*ab is more than 10

<Dispersion Stability Evaluation>

After the viscosity of the pigment dispersing liquid which was obtained as described above was measured using "RE-85L" manufactured by Told Sangyo Co., Ltd.), the viscosity was measured again after leaving the dispersing liquid to be still for 3 days at 45° C., and based on the viscosity difference (ΔVis) before and after the measuring, the dispersion stability were evaluated according to the evaluation criteria below. The smaller the numerical value, the more favorable the dispersion stability. A to C are levels at which there is no problem in actual usage.

<Evaluation Criteria>
A: ΔVis is 0.5 or less
B: Δ Vis is more than 0.5 to 1.0
C: Δ Vis is more than 1.0 to 2.0
D: Δ Vis is more than 2.0

<Resin Transparency Evaluation>

A coating film was formed by coating the polymer B-1 which was synthesized in Synthesis Example 1 on a glass substrate using a spincoater (manufactured by Mikasa Co., Ltd.). Then, a heating process (prebaking) was performed at 100° C. for 120 seconds using a hotplate. Subsequently, heating was performed at 250° C. for 10 minutes. The color difference (ΔE*ab) before and after heating at 250° C. for 10 minutes was measured using a spectrophotometer MCPD-3000 (manufactured by Otsuka Electronics Co., Ltd.). Based on the measured color difference (ΔE*ab), the resin transparency was evaluated according to the evaluation criteria below. The smaller the numerical value, the more favorable the transparency.

<Evaluation Criteria>
A: ΔE*ab is 3 or less
B: ΔE*ab is more than 3 to 10
C: ΔE*ab is more than 10

Examples 2 to 41 and Comparative Examples 1 to 9

The evaluation was performed in the same manner as for Example 1 apart from changing the polymer B-1 and the pigment which were used in Example 1 to the polymer and dye or pigment shown in Table 3 below.

In Table 3 below, PV23 represents Pigment Violet 23, PY139 represents Pigment Yellow 139, PR254 represents Pigment Red 254, PR177 represents Pigment Red 177, PB15:6 represents Pigment Blue 15:6, PG58 represents Pigment Green 58, and dye 1 represents the compounds below. The dye 1 was synthesized by the method described in paragraph "0504" in JP2012-158740A.

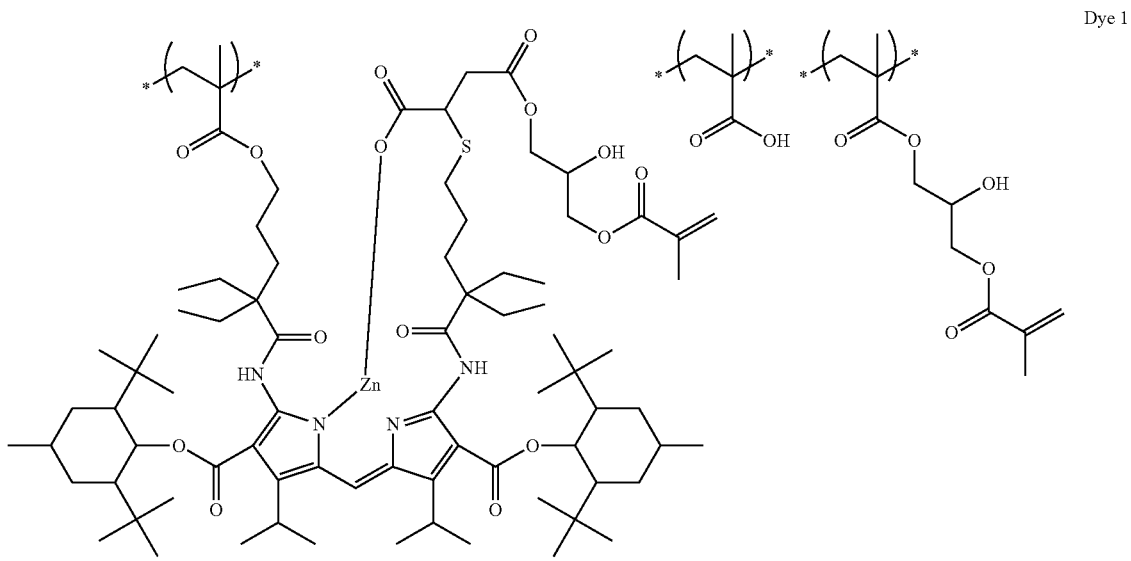

Dye 1

TABLE 3

|  | (B) Polymer | (A) Pigment | Light resistance | Dispersion stability | Resin transparency |
|---|---|---|---|---|---|
| Example 1 | B-1 | Formula (A5): 8.9 parts, PY139: 2.7 parts | A | A | B |
| Example 2 | B-2 | Formula (A5): 8.9 parts, PY139: 2.7 parts | A | A | B |
| Example 3 | B-3 | Formula (A5): 8.9 parts, PY139: 2.7 parts | A | A | A |
| Example 4 | B-4 | Formula (A5): 8.9 parts, PY139: 2.7 parts | A | A | A |
| Example 5 | B-5 | Formula (A5): 8.9 parts, PY139: 2.7 parts | A | A | A |
| Example 6 | B-6 | Formula (A5): 8.9 parts, PY139: 2.7 parts | B | A | B |
| Example 7 | B-7 | Formula (A5): 8.9 parts, PY139: 2.7 parts | A | A | A |
| Example 8 | B-8 | Formula (A5): 8.9 parts, PY139: 2.7 parts | A | B | B |
| Example 9 | B-9 | Formula (A5): 8.9 parts, PY139: 2.7 parts | A | B | A |

TABLE 3-continued

| | (B) Polymer | (A) Pigment | Light resistance | Dispersion stability | Resin transparency |
|---|---|---|---|---|---|
| Example 10 | B-10 | Formula (A5): 8.9 parts, PY139: 2.7 parts | A | A | B |
| Example 11 | B-11 | Formula (A5): 8.9 parts, PY139: 2.7 parts | A | A | A |
| Example 12 | B-12 | Formula (A5): 8.9 parts, PY139: 2.7 parts | A | A | B |
| Example 13 | B-13 | Formula (A5): 8.9 parts, PY139: 2.7 parts | A | A | A |
| Example 14 | B-14 | Formula (A5): 8.9 parts, PY139: 2.7 parts | A | A | B |
| Example 15 | B-15 | Formula (A5): 8.9 parts, PY139: 2.7 parts | A | A | A |
| Example 16 | B-16 | Formula (A5): 8.9 parts, PY139: 2.7 parts | A | B | A |
| Example 17 | B-17 | Formula (A5): 8.9 parts, PY139: 2.7 parts | A | A | A |
| Example 18 | B-18 | Formula (A5): 8.9 parts, PY139: 2.7 parts | A | A | A |
| Example 19 | B-19 | Formula (A5): 8.9 parts, PY139: 2.7 parts | A | A | A |
| Example 20 | B-20 | Formula (A5): 8.9 parts, PY139: 2.7 parts | A | A | B |
| Example 21 | B-21 | Formula (A5): 8.9 parts, PY139: 2.7 parts | A | A | A |
| Example 22 | B-22 | Formula (A5): 8.9 parts, PY139: 2.7 parts | A | A | A |
| Example 23 | B-23 | Formula (A5): 8.9 parts, PY139: 2.7 parts | A | A | A |
| Example 24 | B-24 | Formula (A5): 8.9 parts, PY139: 2.7 parts | A | A | A |
| Example 25 | B-25 | Formula (A5): 8.9 parts, PY139: 2.7 parts | A | A | A |
| Example 26 | B-26 | Formula (A5): 8.9 parts, PY139: 2.7 parts | A | A | A |
| Example 27 | B-12 | $TiO_2$: 11.6 parts | A | A | B |
| Example 28 | B-12 | Carbon black: 11.6 parts | A | A | B |
| Example 29 | B-3 | Titanium black: 11.6 parts | A | A | A |
| Example 30 | B-9 | PV23: 11.6 parts | A | B | A |
| Example 31 | B-9 | PY139: 11.6 parts | A | B | A |
| Example 32 | B-3 | PR254: 11.6 parts | A | A | A |
| Example 33 | B-3 | PB15:6: 11.6 parts | A | A | A |
| Example 34 | B-4 | PG58: 11.6 parts | A | A | A |
| Example 35 | B-4 | PB15:6: 7.7 parts, Dye 1: 3.9 parts | A | A | A |
| Example 36 | B-3 | Formula (A5): 4.5 parts, PR254: 4.4 parts, PY139: 2.7 parts | A | A | A |
| Example 37 | B-3 | Formula (A5): 4.5 parts, PR177: 4.4 parts, PY139: 2.7 parts | A | A | A |
| Example 38 | B-27 | Formula (A5): 8.9 parts, PY139: 2.7 parts | A | C | A |
| Example 39 | B-28 | Formula (A5): 8.9 parts, PY139: 2.7 parts | A | C | A |
| Example 40 | B-29 | Formula (A5): 8.9 parts, PY139: 2.7 parts | A | C | A |
| Example 41 | B-30 | Formula (A5): 8.9 parts, PY139: 2.7 parts | A | C | A |
| Comparative Example 1 | Comparative Polymer 1 | Formula (A5): 8.9 parts, PY139: 2.7 parts | A | D | A |
| Comparative Example 2 | Comparative Polymer 2 | Formula (A5): 8.9 parts, PY139: 2.7 parts | A | D | B |
| Comparative Example 3 | Comparative Polymer 3 | Formula (A5): 8.9 parts, PY139: 2.7 parts | A | D | A |
| Comparative Example 4 | Comparative Polymer 4 | Formula (A5): 8.9 parts, PY139: 2.7 parts | A | D | B |
| Comparative Example 5 | Comparative Polymer 5 | Formula (A5): 8.9 parts, PY139: 2.7 parts | C | A | B |
| Comparative Example 6 | Comparative Polymer 6 | Formula (A5): 8.9 parts, PY139: 2.7 parts | C | A | B |
| Comparative Example 7 | Comparative Polymer 7 | Formula (A5): 8.9 parts, PY139: 2.7 parts | D | A | C |
| Comparative Example 8 | Comparative Polymer 8 | Formula (A5): 8.9 parts, PY139: 2.7 parts | A | D | A |
| Comparative Example 9 | Comparative Polymer 9 | Formula (A5): 8.9 parts, PY139: 2.7 parts | A | D | A |

As is clear from Table 3 above, it was understood that, according to the present invention, it is possible to provide a composition with favorable long-term light resistance in an environment having a low oxygen concentration when the composition is formed into a coating film while maintaining the dispersibility and dispersion stability of a pigment.

What is claimed is:

1. A composition comprising:
   (A) a pigment; and
   (B) a polymer having (b-1) a bulky amine moiety, (b-2) an acid group, and (b-3) a constituent unit derived from a macromonomer having a weight average molecular weight of 1000 to 50000,
   wherein the bulky amine moiety (b-1) has a nitrogen atom, carbon atoms $X^1$ bonded with the nitrogen atom, and carbon atoms $Y^1$ bonded with the carbon atoms $X^1$, the total carbon number of carbon atoms $X^1$ and the carbon atoms $Y^1$ is 7 or more, and the bulky amine moiety (b-1) has a structure represented by $-CH(CH_3)_2$ or a saturated cyclic amine structure which includes a nitrogen atom in a ring.

2. The composition according to claim 1, wherein the bulky amine moiety (b-1) is represented by General Formula (b-1A) below:

General Formula (b-1A)

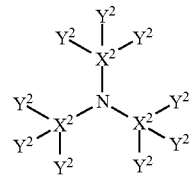

wherein the structure of General Formula (b-1A) includes a saturated cyclic amine structure which includes a nitrogen atom in a ring, $X^2$ are each a hydrogen atom, an oxygen atom, or a carbon atom, and Y² are each an arbitrary atom; there is no atom which corresponds to Y² when X² is a hydrogen atom; there is no atom which corresponds to Y² when X² is an oxygen atom with a free radical structure; the total carbon number of carbon atoms of X² and Y² is 7 or more; and Y² may bonded to each other to form a ring.

3. The composition according to claim 1,
wherein the total carbon number of the carbon atoms X¹ and the carbon atoms Y¹ is 8 or more.

4. The composition according to claim 2,
wherein the total carbon number of carbon atoms of X² and Y² in General Formula (b-1A) is 8 or more.

5. The composition according to claim 1,
wherein the polymer (B) is represented by General Formula (B-1) below:

General Formula (B-1)

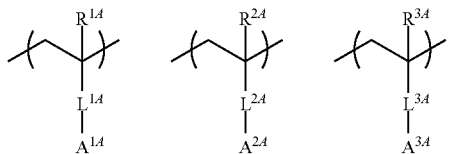

in General Formula (B-1), $R^{1A}$ to $R^{3A}$ each independently represent a hydrogen atom or a methyl group; $L^{1A}$ to $L^{3A}$ each independently represent a single bond or a divalent linking group; $A^{1A}$ represents the bulky amine moiety (b-1); $A^{2A}$ represents the acid group (b-2); and $A^{3A}$ represents the moiety (b-3) having a weight average molecular weight of 1000 to 50000.

6. The composition according to claim 1,
wherein the acid value of the polymer (B) is 15 mgKOH/g to 250 mgKOH/g.

7. The composition according to claim 1,
wherein the amine value of the polymer (B) is 0.2 mmol/g to 2.5 mmol/g.

8. The composition according to claim 1, further comprising:
a pigment derivative.

9. The composition according to claim 1,
wherein the acid group (b-2) is at least one group selected from the group consisting of a carboxyl group, a sulfonic acid group, a phosphoric acid group, an acetoacetyl group, and a phenol group.

10. The composition according to claim 1,
wherein the constituent unit (b-3) derived from a macromonomer having a weight average molecular weight of 1000 to 50000 has a constituent unit which is represented by General Formula (b-3B) below:

General Formula (b-3B)

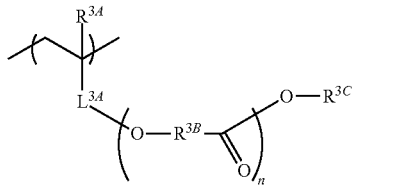

in General Formula (b-3B), $R^{3A}$ represents a hydrogen atom or a methyl group; $L^{3A}$ represents a single bond or a divalent linking group; $R^{3B}$ represents an alkylene group; $R^{3C}$ represents an alkyl group; and n represents an integer of 5 to 100.

11. The composition according to claim 1,
wherein the content of the constituent unit which has the bulky amine moiety (b-1) is 20 mol % to 70 mol % of all of the constituent units in the polymer (B).

12. The composition according to claim 1, further comprising:
a solvent.

13. The composition according to claim 12,
wherein the composition is a dispersion in which a pigment, of which the degree of solubility with respect to the solvent at 25° C. is 0.001 g/100 g solvent or less, is dispersed.

14. The composition according to claim 1, further comprising:
a photopolymerization initiator; and
a photopolymerizable compound.

15. A cured film formed by curing the composition according to claim 14.

16. A color filter comprising:
a colored layer formed from the composition according to claim 14.

17. A laminate comprising:
the cured film according to claim 15; and
an oxygen-impermeable film of which the oxygen transmission rate is 50 ml/m²·day·atm or less.

18. A pigment dispersant comprising:
(B) a polymer having (b-1) a bulky amine moiety, (b-2) an acid group, and (b-3) a constituent unit derived from a macromonomer having a weight average molecular weight of 1000 to 50000,
wherein the bulky amine moiety (b-1) has a nitrogen atom, carbon atoms X¹ bonded with the nitrogen atom, and carbon atoms Y¹ bonded with the carbon atoms X¹,
the total carbon number of carbon atoms X¹ and the carbon atoms Y¹ is 7 or more, and
the bulky amine moiety (b-1) has a structure represented by —CH(CH₃)₂ or a saturated cyclic amine structure which includes a nitrogen atom in a ring.

19. The composition according to claim 1,
wherein the bulky amine moiety (b-1) is a saturated cyclic amine structure which includes a nitrogen atom in a ring.

20. The composition according to claim 1,
wherein the bulky amine moiety (b-1) is a structure represented by General Formula (b-1-a), (b-1-c), or (b-1-d) below:

(b-1-a)

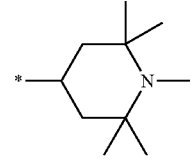

(b-1-c)

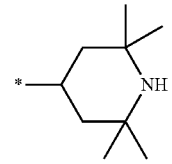

(b-1-d)

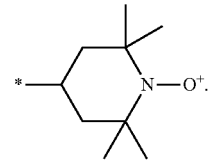

* * * * *